(12) United States Patent
Weaver et al.

(10) Patent No.: US 7,150,415 B2
(45) Date of Patent: Dec. 19, 2006

(54) PRE-RINSE UNIT SPRAY VALVE MECHANISM

(75) Inventors: Mark V. Weaver, Six Mile, SC (US); Luke Edward Langner, Greenville, SC (US)

(73) Assignee: T&S Brass and Bronze Works, Inc., Travelers Rest, SC (US)

( * ) Notice: Subject to any disclaimer, the term of this patent is extended or adjusted under 35 U.S.C. 154(b) by 0 days.

(21) Appl. No.: 11/280,852

(22) Filed: Nov. 16, 2005

(65) Prior Publication Data
US 2006/0124773 A1 Jun. 15, 2006

Related U.S. Application Data

(60) Provisional application No. 60/628,524, filed on Nov. 16, 2004.

(51) Int. Cl.
*A62C 31/00* (2006.01)
*B05B 15/08* (2006.01)

(52) U.S. Cl. .................. 239/443; 239/569; 239/588; 239/526; 239/525; 4/678; 137/801

(58) Field of Classification Search ............ 239/569, 239/390–397, 436–449, 525–532, 587.1–588; 4/678; 137/801
See application file for complete search history.

(56) References Cited

U.S. PATENT DOCUMENTS

| | | | |
|---|---|---|---|
| 2,971,520 A | 2/1961 | Motis et al. | |
| 4,156,519 A | 5/1979 | Janz et al. | |
| 4,456,287 A | 6/1984 | Bisonaya | |
| 5,316,039 A | 5/1994 | Haag et al. | |
| 5,364,135 A | 11/1994 | Anderson | |
| 5,375,887 A | 12/1994 | Johnson | |
| 5,624,074 A | 4/1997 | Parisi | |
| 6,085,790 A * | 7/2000 | Humpert et al. | 137/801 |
| 6,738,996 B1 * | 5/2004 | Malek et al. | 4/677 |
| 6,749,134 B1 * | 6/2004 | Arenson et al. | 239/393 |
| 6,820,291 B1 | 11/2004 | Weaver | |

FOREIGN PATENT DOCUMENTS

| | | |
|---|---|---|
| DE | 2260754 | 7/1974 |
| DE | 4238055 A1 | 5/1994 |
| DE | 29624335 U1 | 6/2002 |
| EP | 1132141 A2 | 9/2001 |

OTHER PUBLICATIONS

Partial European Search Report EP 05110514 Jan. 25, 2006.

* cited by examiner

*Primary Examiner*—Dinh Q. Nguyen
(74) *Attorney, Agent, or Firm*—Dority & Manning, PA

(57) ABSTRACT

A spray valve is configured with a fluid path that always provides dynamic water flow on both opposite surfaces of the seating flange of the valve stem when the valve is almost completely closed and when the valve is just beginning to be opened. This equalization of dynamic pressure from the incoming water flow tends to reduce the frequency of vibration that is imposed upon the valve stem and biasing member by the incoming water flow. A check valve is built into the spray valve, which has a trigger lock and a selectively removable spray disk. The valve has an outer sleeve that surrounds the valve's base member and defines a gap therebetween and is formed of mechanical shock-resilient, heat-insulating material.

24 Claims, 19 Drawing Sheets

PRE-RINSE UNIT SPRAY VALVE MECHANISM

CROSS-REFERENCE TO RELATED APPLICATIONS

The present application claims priority to currently pending Provisional Patent Application No. 60/628,524 filed Nov. 16, 2004.

STATEMENT REGARDING FEDERALLY SPONSORED RESEARCH OR DEVELOPEMENT

N/A

BACKGROUND OF THE INVENTION

As shown in FIG. 1, a common fixture in a commercial kitchen is a spray valve 10 on the end of a flexible hose 11 that is connected to a vertical riser 12, especially as part of a pre-rinse unit of a dishwasher line. The spray valve 10 has a lever 13 for manual operation to open and close the valve 10. U.S. Pat. Nos. 2,971,520 and 5,624,074 describe a couple of examples. A common annoyance with conventional spray valves is a chattering noise and accompanying choppy flow of water that results when the valve is nearly closed.

Most of the conventional spray valves employ valve springs that bias the valve stem in a direction that is parallel to the flow of water through the valve. In most conventional spray valves, the flow of water tends to exert a force on the spring in the opposing direction (along the same axis) that the spring exerts the biasing force on the valve stem in the closed position. When the combined forces of the flowing water and the opposing spring in one of these conventional spray valves vibrates the system at the natural frequency of the valve, chatter of the valve results, and water tends to be ejected from the valve in spurts. Moreover, this chatter tends to reverberate through the connecting pipes that bring the water to the spray valve. Designers of conventional spray valves try to prevent such chatter by raising the natural frequency of the spray valve. The elevation of the conventional spray valve's natural frequency is often accomplished by providing a biasing spring with a much higher force constant. However, the increased force constant imposes an additional force requirement on the user in order to press the valve trigger to open the valve to the flow of water. The spring force is applied in opposition to the user's hand that squeezes the valve's trigger against the body of the valve in order to open the valve. The typical force that is required to be applied against the valve trigger to open a conventional spray valve is on the order of three to five pounds at the user interface.

In order to prevent back-siphonage of dirty water from a dishwashing sink under certain conditions, it is necessary to include a back-flow prevention device upstream of the conventional spray valve (either within the base faucet or a separate component disposed in the flow path between the flexible hose and the spray valve or between the rigid riser and the hose or between the base faucet and the rigid riser). Installations that fail to include at the time of installation such a separate back-flow prevention device will suffer from the aforementioned condition at a later date. There are hand held shower heads that include a check valve in the flow conduit that passes through the handle of the shower head, where the check valve is positioned upstream from the shower head and upstream from the valve.

For rinsing dirty dishes for example, the spray valve desirably produces a spray pattern with approximately twenty or so parallel streams. For washing down kitchen floors and walls, the spray valve desirably produces a spray pattern with a single high-velocity jet. When it is desired to conserve water usage, the spray valve desirably produces a low-flow spray pattern. In a conventional spray valve, changing from one spray pattern to another requires installation of a spray face with the appropriate spray pattern. In some conventional spray valves, this often requires removal of a screw that is centrally located on the spray face or removal of another separate retention device or changing out a sub-assembly of or the entire spray valve assembly. The installation thus may require special tools or partial disassembly of some of the components of the device in order to effect the installation.

For washing down kitchen floors and walls, the spray valve must be held in the open valve position for an extended period of time while the water is used to wash down the floor. The operator's hand can become fatigued from the need to apply constant pressure to maintain the spray valve in the open position. In conventional spray valves, a ring is sometimes provided on the body of the valve. The operator can slip this ring over the valve trigger of the valve to hold the valve trigger against the body of the valve and thereby maintain the valve in the open position. However, placement of the ring usually requires using both of the operator's hands. Moreover, during the placement of the ring, the direction of the valve's spray easily can be inadvertently directed where the water is unwanted. Other spray valve versions include a one-handed operable trigger lock—which is a U-shaped loop of stiff wire, such as spring steel wire, that has the two open ends of the wire pivotally mounted near the free end of the valve trigger. When the loop is not in use to engage the free end of the valve trigger to hold the valve trigger in the open valve state, the side legs of the loop are held in a detent formed in the handle. A significant exertion of force by the operator's thumb is required to snap the side legs out of the grasp of the detent to move the loop into position to hold the valve trigger in the open valve state or to snap the side legs into the grasp of the detent in order to restrain the loop in the position to allow the valve trigger to move into a position where the valve is closed.

The hot water that runs through the spray valve typically has a temperature of about 140 degrees Fahrenheit. In a conventional spray valve, the user's hand is positioned typically in close proximity to two relatively large metal (brass) masses that quickly absorb heat from the hot water. Contact temperatures above 105 degrees Fahrenheit typically would be deemed uncomfortable to the user. However, the construction of conventional spray valves attempts to solve this problem by providing air gaps between the water's flow conduit and the actual grip on the spray valve. This solution is not effective to prevent the user from coming into contact with the two relatively large metal masses that are disposed on opposite ends of the grip.

The grip portion of conventional spray valves typically is made of relatively brittle plastic that easily can crack if dropped on the edge of a sink for example. Replacing the grip requires special tools and disassembly. Leaving a broken grip endangers the hand of the user during subsequent use. Some spray valves attempt to solve this problem by providing a grip portion composed of rubber or polyurethane.

The trigger portion of a spray valve is typically equipped with a motion-limiting device to prevent the trigger from falling/moving too far from the intended activation range. This motion-limiting device or the trigger itself is susceptible to damage and one or both often becomes damaged with the passage of time.

OBJECTS AND SUMMARY OF THE INVENTION

It is a principal object of the present invention to provide a spray valve assembly that reduces the chattering typical of conventional spray valves when nearly closed.

It is another principal object of the present invention to provide a spray valve assembly that includes an integral device for preventing back-flow of dirty water from the sink under certain conditions.

It is a further principal object of the present invention to provide a spray valve assembly with a spray face that can be changed quickly by manipulation without tools.

It is a still further principal object of the present invention to provide a spray valve assembly that can be locked in the open valve position more easily than with conventional spray valve assemblies.

It is yet another principal object of the present invention to provide a spray valve assembly that reduces the incidence of user discomfort caused by contact with surfaces heated by the hot water flowing through the valve.

It is also a principal object of the present invention to provide a spray valve assembly that reduces the incidence of damage to the grip caused by accidental impacts with rigid surfaces in the immediate environment of the spray valve.

It is still another principal object of the present invention to provide a spray valve that eliminates the need for a device that limits the total angular motion of the valve activation trigger device.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a spray valve for a pre-rinse unit is provided.

An exemplary embodiment of the spray valve includes a valve body that is integral with a base member that carries a hand grip and is disposed between the valve body and a spray face. The base member, which defines a passage for water to flow from the valve body to the spray face, is desirably formed of a flexible, heat-insulating material such as thermoplastic elastomer's that are mechanical shock-resilient. Surrounding the exterior of the base member is a sleeve that also is desirably formed of a flexible, heat-insulating material such as thermoplastic elastomers and defines an air gap therebetween. A check valve is disposed between the base member and the spray face so as to substantially prevent fluid from flowing in the direction that is away from the spray face and toward the base member.

The spray disk is configured to be selectively removable from the base member. The spray disk defines a plurality of locking tabs that extend radially from the sidewall of the spray disk. The base member includes an annular wall that defines an outlet opening. Recessed beneath the interior surface that defines the annular wall, the annular wall further defines at least a pair of locking grooves. Each locking groove is spaced apart from the other locking grooves and forms a radially recessed volume. Each of the locking grooves is desirably configured to receive axially and rotatably therein a mating locking tab of the spray disk. The locking tabs and locking grooves are configured so that less one quarter rotation of the spray disk in a first direction will selectively lock the spray disk to the outlet opening of the valve.

The annular sidewall of the spray disk further defines an annular groove in which is nested a sealing gasket formed of a deformable elastic material that forms a water-tight seal against the base member. In this arrangement, each changing of the spray disk provides a fresh sealing gasket. Additionally, a plurality of spaced apart, truncated conically shaped posts extends axially from the inner face of the spray disk, and the posts are grouped near the center of the spray disk, are arranged symmetrically with respect to one another. Each post tapers gradually from the base that is connected to the inner face of the spray disk to the free end of the post that is disposed farthest from the inner face of the spray disk. The length of each post measured from the surface of the inner face of the spray disk desirably is about equal to or greater than the radius of the spray disk but less than the diameter of the spray disk. When the spray disk is installed in the spray valve, the posts project into the expansion chamber and aid in the even distribution of the water through the flow nozzle passages that are defined through the spray disk.

The valve body defines a channel that extends transversely to the axial direction in which the flow of fluid enters and exits the valve body. A valve seal surface is disposed desirably between the inlet and the outlet of the valve body. A valve stem is disposed within the channel and in particular is disposed slideably relative to the channel and the valve seal surface. A sealing gasket is disposed behind a seating flange near one end of the valve stem so that the valve stem may be moved transversely between a first location where the valve is closed to the flow of fluid from the inlet to the outlet and a second position where the valve is open to the flow of fluid from the inlet to the outlet.

A resilient biasing member is seated in front of the seating flange of the valve stem and configured to bias the valve stem's sealing gasket against the valve seal surface and thereby keep the valve closed to the flow of fluid from the inlet to the outlet. The position of the seating flange of the valve stem relative to the flow path of water through the valve body ensures that there will always be dynamic water flow on both opposite surfaces of the seating flange of the valve stem when the valve is almost completely closed and when the valve is just beginning to be opened. Thus, the dynamic pressure applied by the water flow that enters the valve body through the inlet opening essentially will be equalized on both opposite sides of the seating flange of the valve stem when the valve is almost completely closed and when the valve is just beginning to be opened.

This equalization of dynamic pressure from the incoming water flow tends to reduce the frequency of vibration that is imposed upon the valve stem and the biasing member by the incoming water flow. Accordingly, the valve stem and the biasing spring do not attain the natural frequency of vibration of this mechanical system and therefore avoid the undesirable chattering that characterizes most conventional spray valves. Moreover, a lower natural frequency of vibration can be tolerated and a biasing spring with a lower force constant than a conventional spray valve can be employed. Desirably, the resilient biasing member is a spring with a force constant on the order of one to three pounds per inch.

A valve trigger is disposed to be selectively engageable with the first end of the valve stem to enable the operator to squeeze the trigger against the biasing action of the biasing member to open the valve to the flow of water out of the spray face. The valve trigger is spring-loaded in a manner that works in concert with the resilient biasing member. Additionally, the spring-loading of the valve trigger is damped so that the valve trigger does not move too suddenly from the open valve position into the closed valve position. Instead, as a consequence of the damping action, the valve trigger moves only gradually from the open valve position into the closed valve position.

A trigger lock member is pivotally connected to the valve body and is configured and disposed to be selectively positionable in a locked position and in an unlocked position by the flick of the operator's thumb to so position the trigger lock member. In the locked position, the valve body is locked into the open valve configuration so that the operator can relax the grip on the valve trigger while the valve remains open for continuous spraying such as is useful in washing down the floor for example. The spring-loading of the valve trigger allows the valve trigger to capture the trigger lock member in its locked orientation so that the operator's hand need no longer squeeze the valve trigger to keep the valve open.

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
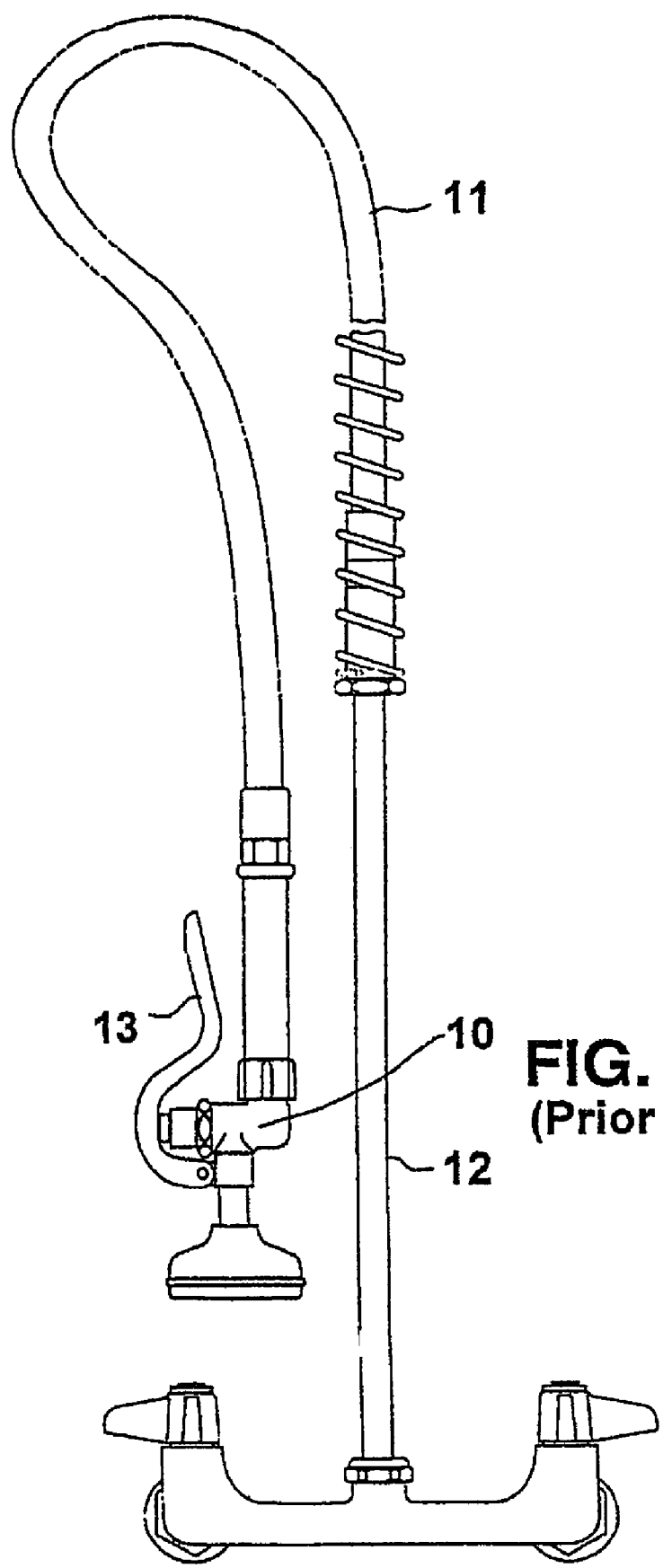
FIG. 1 is a side plan view of a conventional spray valve that is installed as part of a spray valve assembly.
Figure 2:
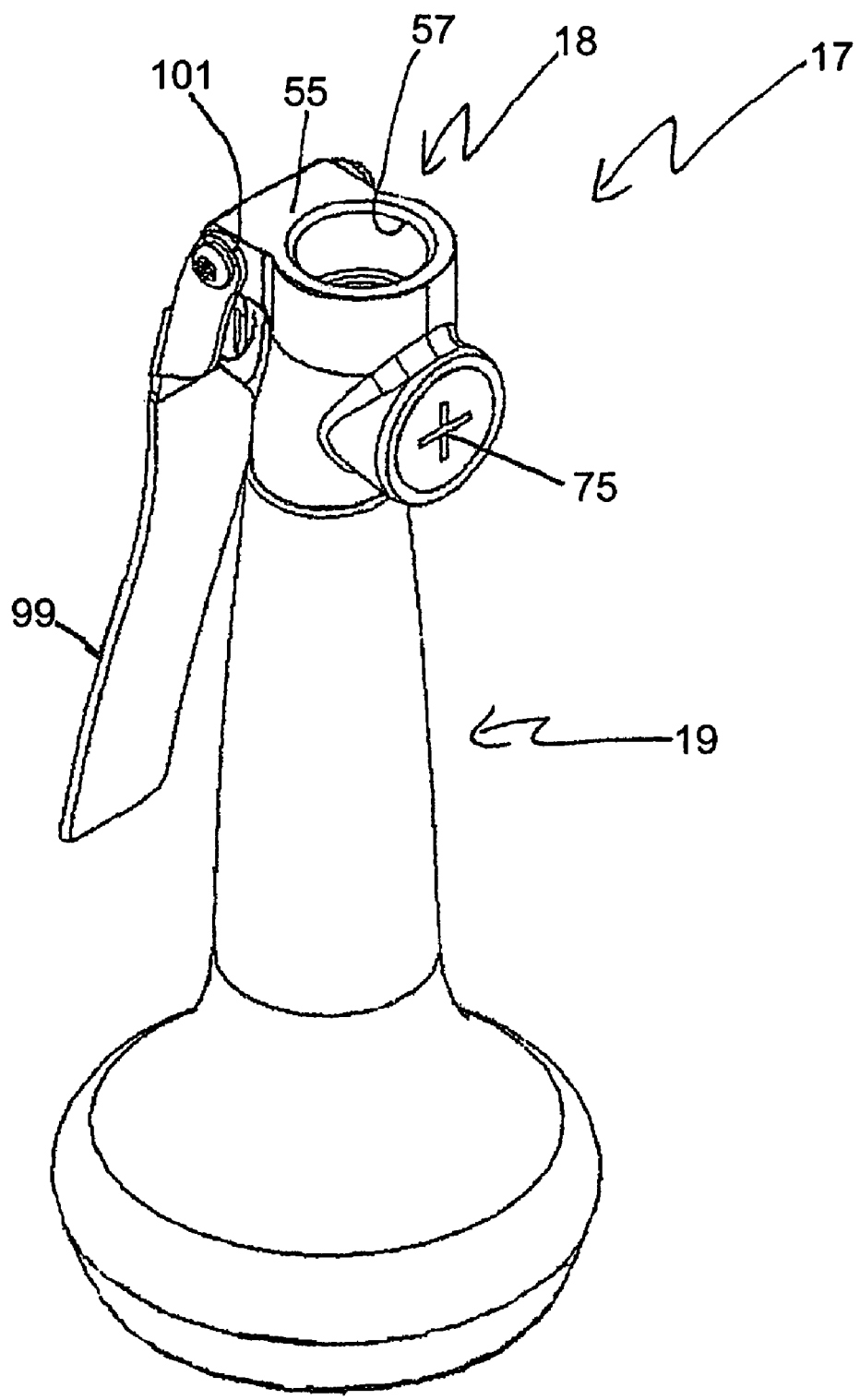
FIG. 2 is an elevated perspective view of a presently preferred embodiment of a spray valve in accordance with the present invention.
Figure 3:
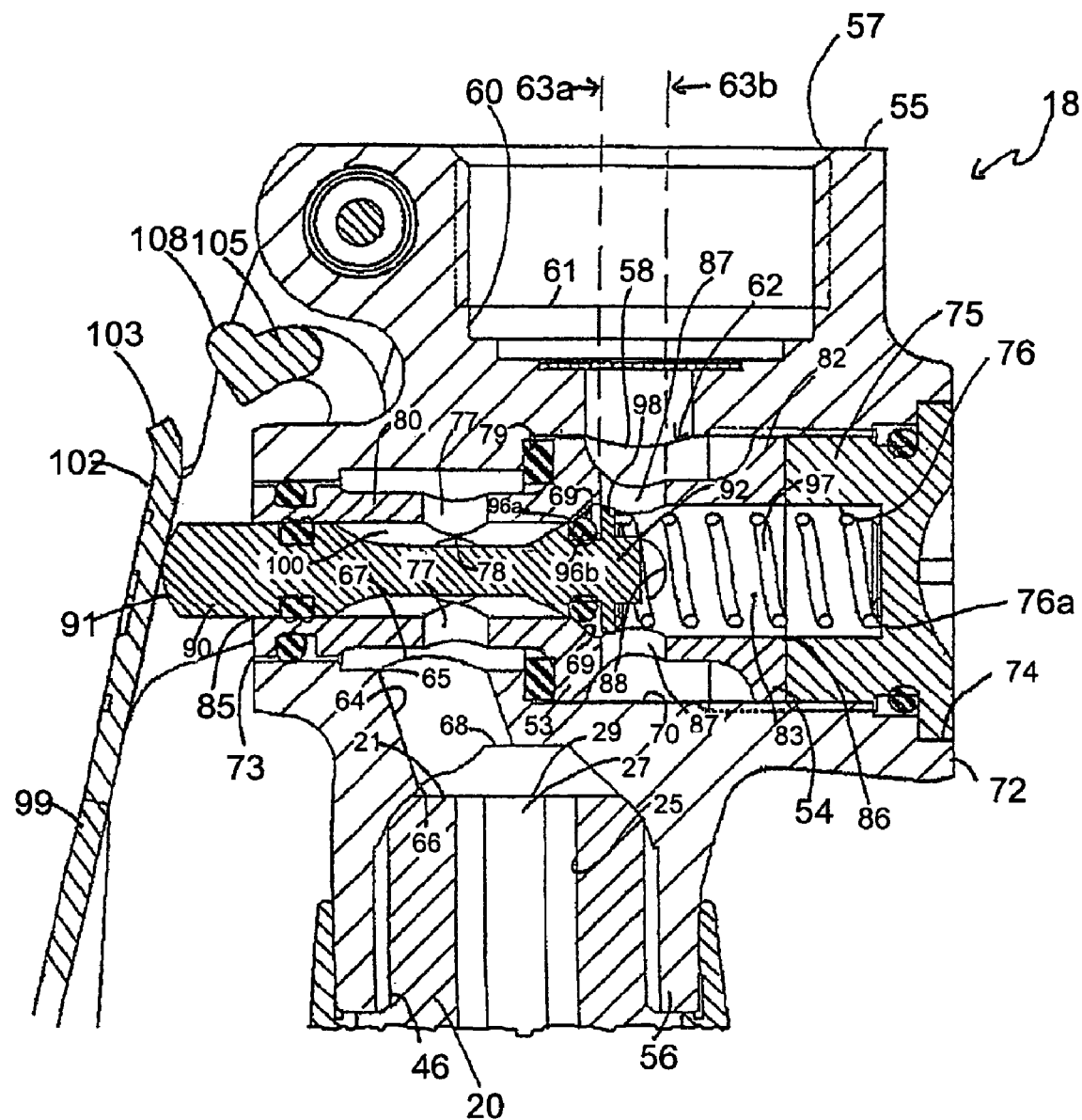
FIG. 3 is a cross-sectional view of one presently preferred embodiment of a spray valve in accordance with the present invention in an almost closed configuration.

A presently preferred embodiment of the spray valve of the present invention is shown in an elevated perspective view in FIG. 2 and is represented generally by the numeral 17. The spray valve desirably includes a valve body (denoted generally by the numeral 18) that is integral with a hand grip (denoted generally by the numeral 19). FIG. 3 shows in an axial, cross-sectional view, the valve body 18 that forms the upper portion of the spray valve. In a similar axial, cross-sectional view, FIG. 4 shows the hand grip 19 that forms the lower portion of the spray valve.

Figure 4:
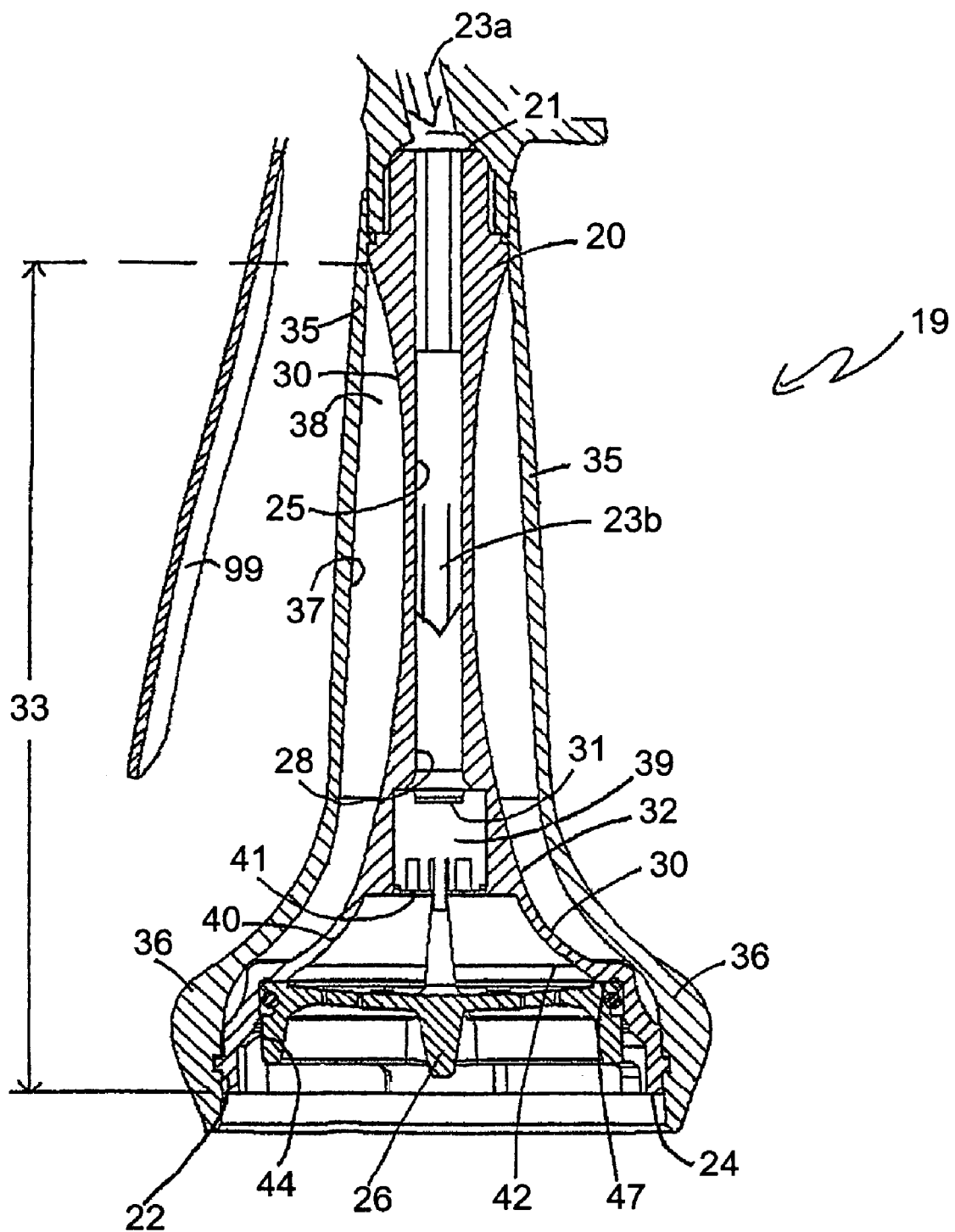
FIG. 4 is a cross-sectional view of a presently preferred embodiment of several aspects of a spray valve in accordance with the present invention.
Figure 5:
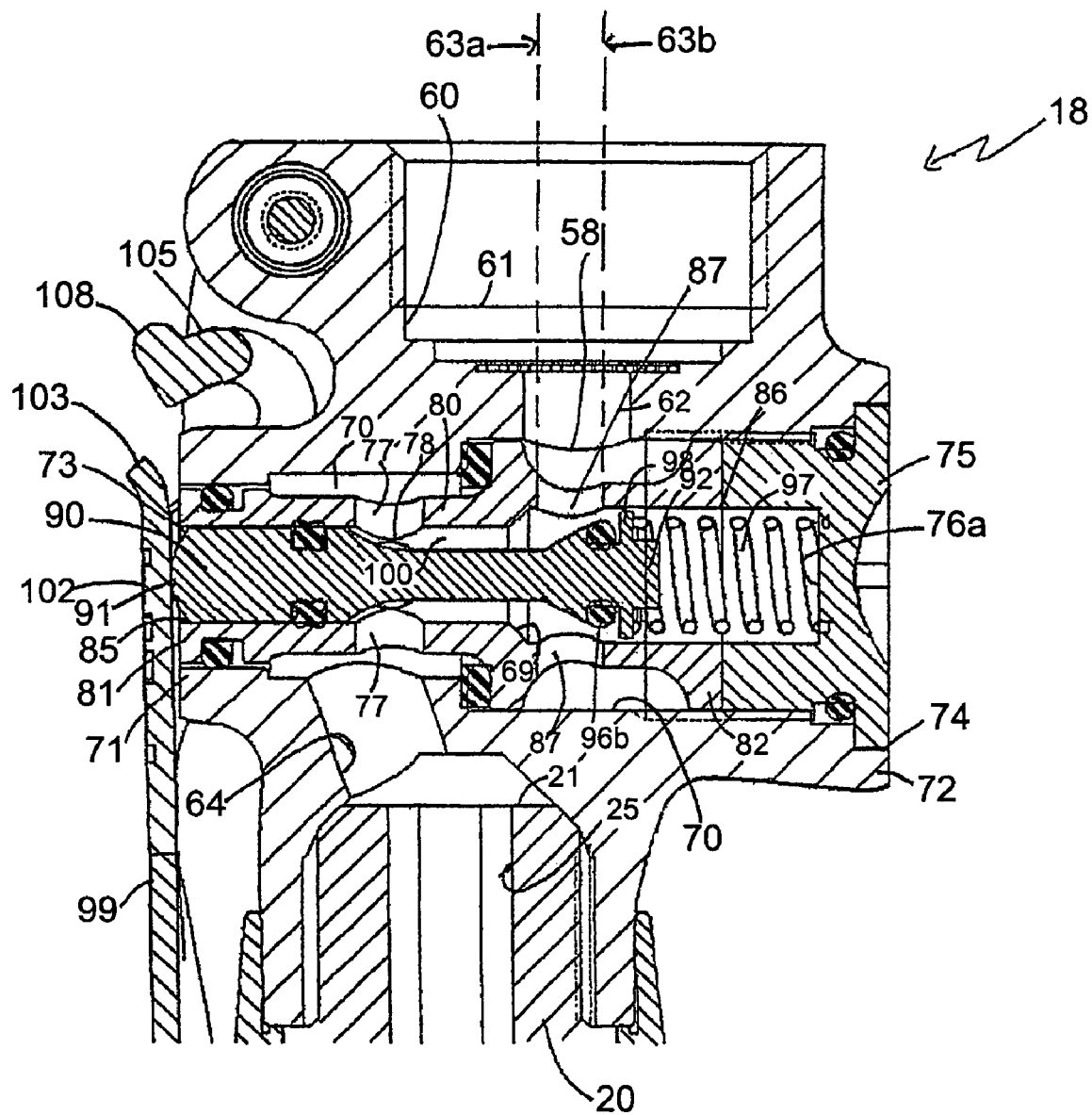
FIG. 5 is a cross-sectional view of a presently preferred embodiment of one aspect of a spray valve in accordance with the present invention in a wide open configuration.

As shown in cross-section in FIG. 4, the hand grip 19 of the spray valve includes a base member 20 that extends generally in an axial direction and defines a first end 21. The base member 20 further defines a second end 22, which is disposed opposite the first end 21, which also is shown in FIGS. 5 and 3. The two arrows designated 23*a* and 23*b* in FIG. 4 point in the downstream direction. As shown in FIGS.

4 and 6, the base member 20 defines an outlet opening 24 at the second end 22 of the base member 20.

As shown in FIGS. 3 and 4, the base member 20 of the hand grip 19 (FIG. 4) defines a hollow passage 25 that extends generally axially and internally over a substantial portion of the base member that defines the elongated section of the base member. The internal surface that defines the passage 25 is generally cylindrical in shape but can be formed with other shapes that lack a circular transverse cross-section. As shown in FIG. 3, the passage has a first end 27. As shown in FIG. 4, the passage has a second end 28 that is disposed opposite the first end 27 of the passage shown in FIG. 3. As shown in FIG. 3, the base member 20 defines an entrance opening 29 to the passage 25 at the first end 21 of the base member 20 and the first end 27 of the passage 25. As shown in FIG. 4, the base member 20 defines an outlet port 31 of the passage 25, and the outlet port 31 is disposed axially downstream from the entrance opening 29 (FIG. 3) of the passage 25 and upstream from the outlet opening 24 of the base member 20. Liquid leaving the passage 25 flows out of the outlet port 31.

In accordance with one aspect of the present invention, the base member 20, which defines the passage 25, is desirably formed of a flexible material. Thermoplastic elastomers are such flexible materials that are suitable for forming the base member 20. This flexible material must be capable of carrying the water that flows through the spray valve 17 at elevated temperatures on the order of up to 200 degrees Fahrenheit to provide a margin of safety with the expected water temperatures ranging up to about 160 degrees Fahrenheit. Moreover, the flexible material desirably also is relatively heat-insulating to provide an extra measure of protection for the hand of the operator. Such material also desirably is mechanical shock-resilient.

As shown in FIG. 4, the base member 20 defines an exterior surface 30 having at the first end a generally cylindrical shape in the portion that defines the passage. The exterior surface 30 of the base member 20 defines a flared shape near the second end 22 of the base member. The diameter of the exterior surface 30 of this flared portion 32 of the base member 20 increases as one proceeds in the downstream direction that points from the first end 21 of the base member 20 to the outlet opening 24 of the base member. The flared portion 32 of the base member 20 is likewise desirably formed of the same flexible material as the elongated section of the base member that defines the passage 25 internally thereof. Thus, this flared portion 32 of the base member is likewise desirably composed of flexible material such as a thermoplastic elastomer noted above. It is particularly desirable that the portion of the base member 20 that is confined between the expanse that is denoted schematically by the arrows designated 33 in FIG. 4, be formed of the flexible material noted above.

As shown in FIG. 4, an outer sleeve 35 surrounds the base member 20. This outer sleeve 35 is connected to the base member at the first end 21 and at the second end 22 of the base member 20. Thus, one end of the sleeve 35 is shaped to accommodate the flared portion 32 of the base member 20 and accordingly is configured to define a flared portion 36 that receives the flared portion 32 of the base member 20. As shown in FIG. 3, the opposite end of the sleeve 35 is shaped to accommodate the interface between the valve body 18 and the base member 20.

As shown in FIG. 4, the outer sleeve 35 defines an inner surface 37, as the outer sleeve 35 is hollow internally. The inner surface 37 of the outer sleeve 35 and the exterior surface 30 of the base member 20 define a gap 38 between them. The outer sleeve 35 desirably is formed from a heat-insulating flexible material that is mechanical shock-resilient. A thermoplastic elastomer material desirably provides a suitable heat-insulating flexible material for composing the outer sleeve 35.

Figure 7:
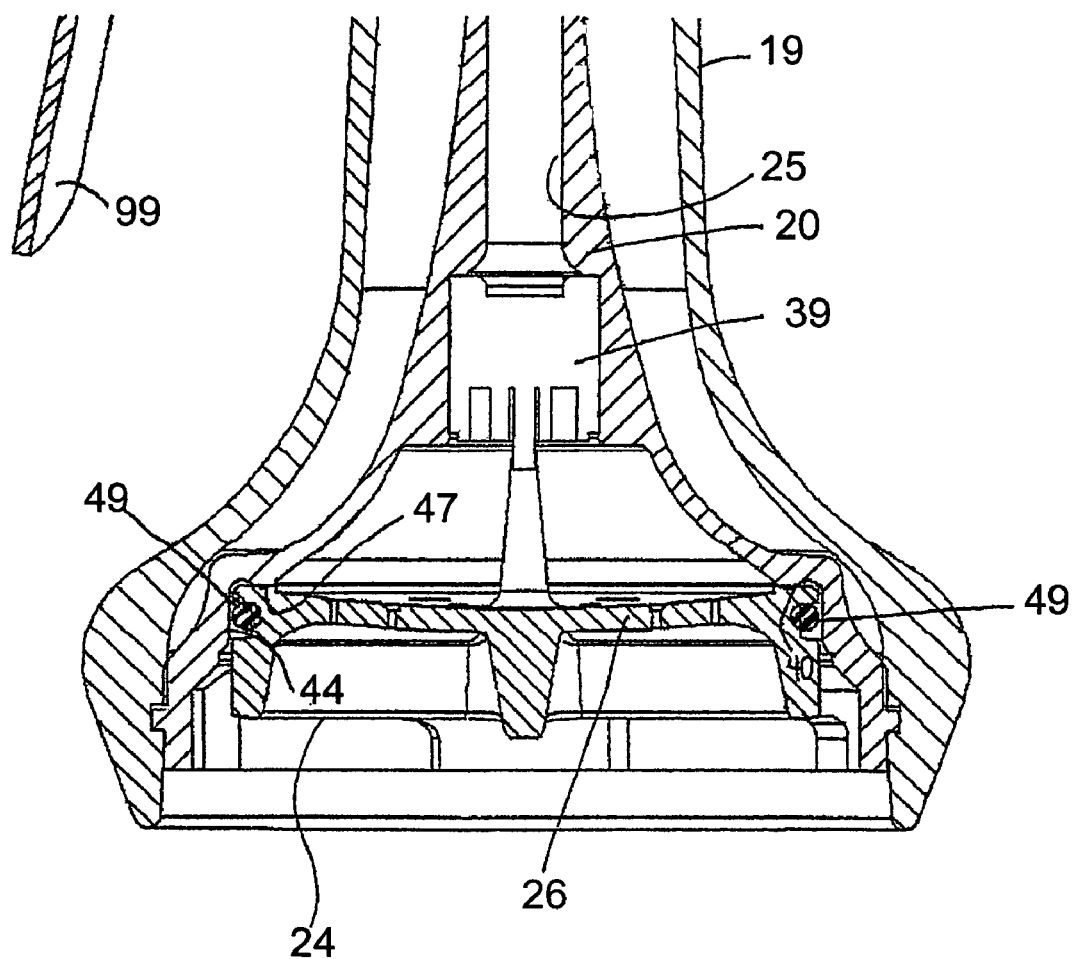
FIG. 7 is a cross-sectional view of a presently preferred embodiment of features of a spray valve as shown in FIG. 6.

In accordance with an aspect of the spray valve of the present invention, a check valve forms an integral part of the fluid flow path of the spray valve itself. As shown in FIGS. 7 and 4, a check valve 39 is connected in fluid communication between the second end 28 of the passage 25 and the outlet opening 24 of the base member 20. This check valve 39 is configured so that the check valve permits fluid flow in a downstream direction, which points in the direction of arrow 23b toward the outlet opening 24 of the base member 20. Moreover, this check valve 39 substantially prevents fluid from flowing in the upstream direction, which is the direction that is opposite to the downstream direction. Because the check valve 39 forms an integral component of the spray valve of the present invention, the need for separate installation of a back-flow prevention device at the facility where the spray valve 17 is to be installed, is eliminated. This saves time and expense for the installer and for the commercial user that is the installer's customer.

Figure 6:
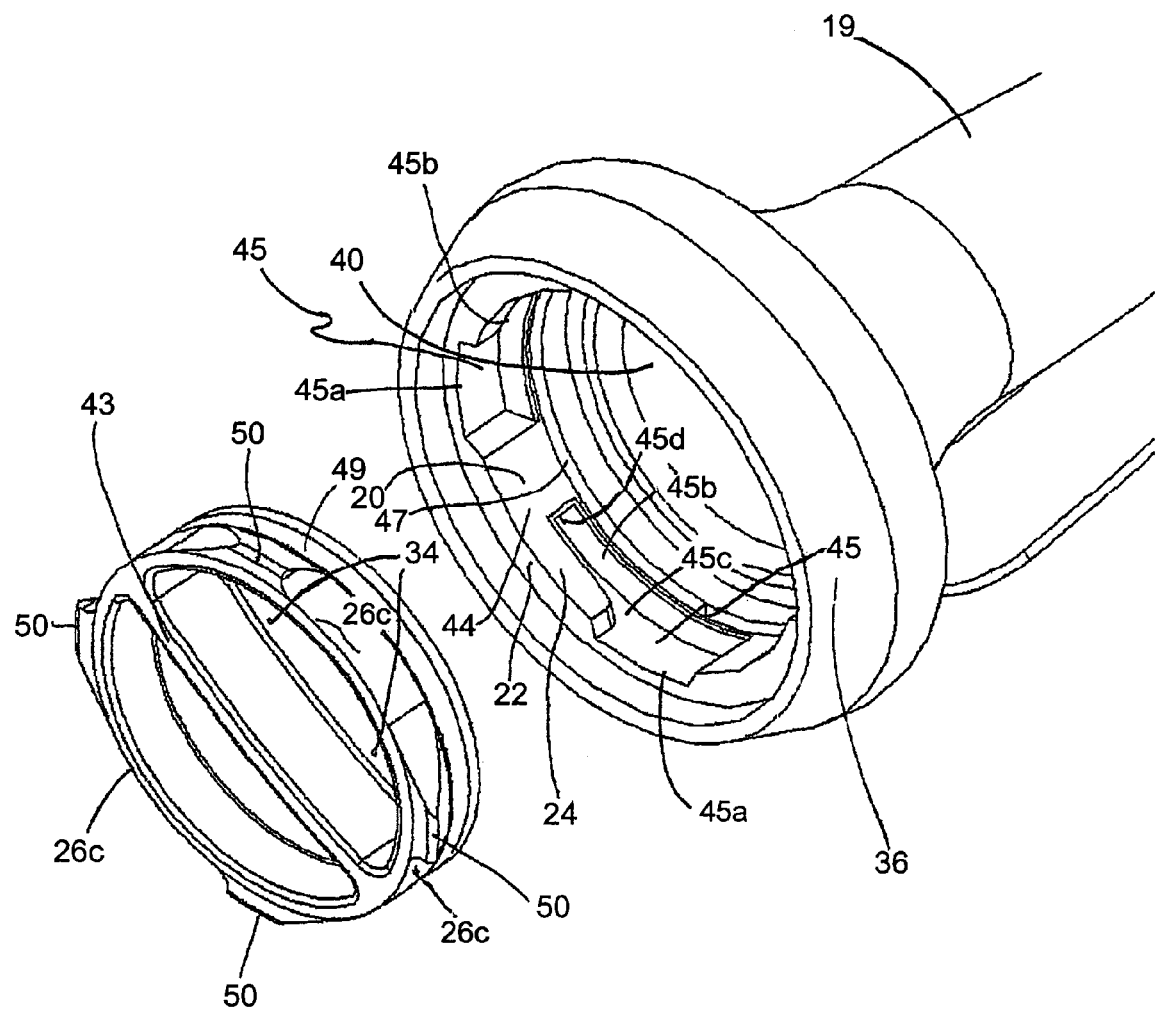
FIG. 6 is an elevated perspective view of the assembly of components of a presently preferred embodiment of another aspect of a spray valve in accordance with the present invention.

As shown in FIGS. 4 and 6, the base member 20 defines an expansion chamber 40. As shown in FIG. 4, the expansion chamber 40 has an inlet 41, which is connected in fluid communication with the outlet of the check valve 39 and with the second end 28 of the passage 25. The expansion chamber 40 has an outlet 42 that is connected in fluid communication with the outlet opening 24 of the base member 20. The walls that define the expansion chamber 40 diverge when proceeding in the axial direction from the inlet 41 to the outlet 42.

Figure 8:
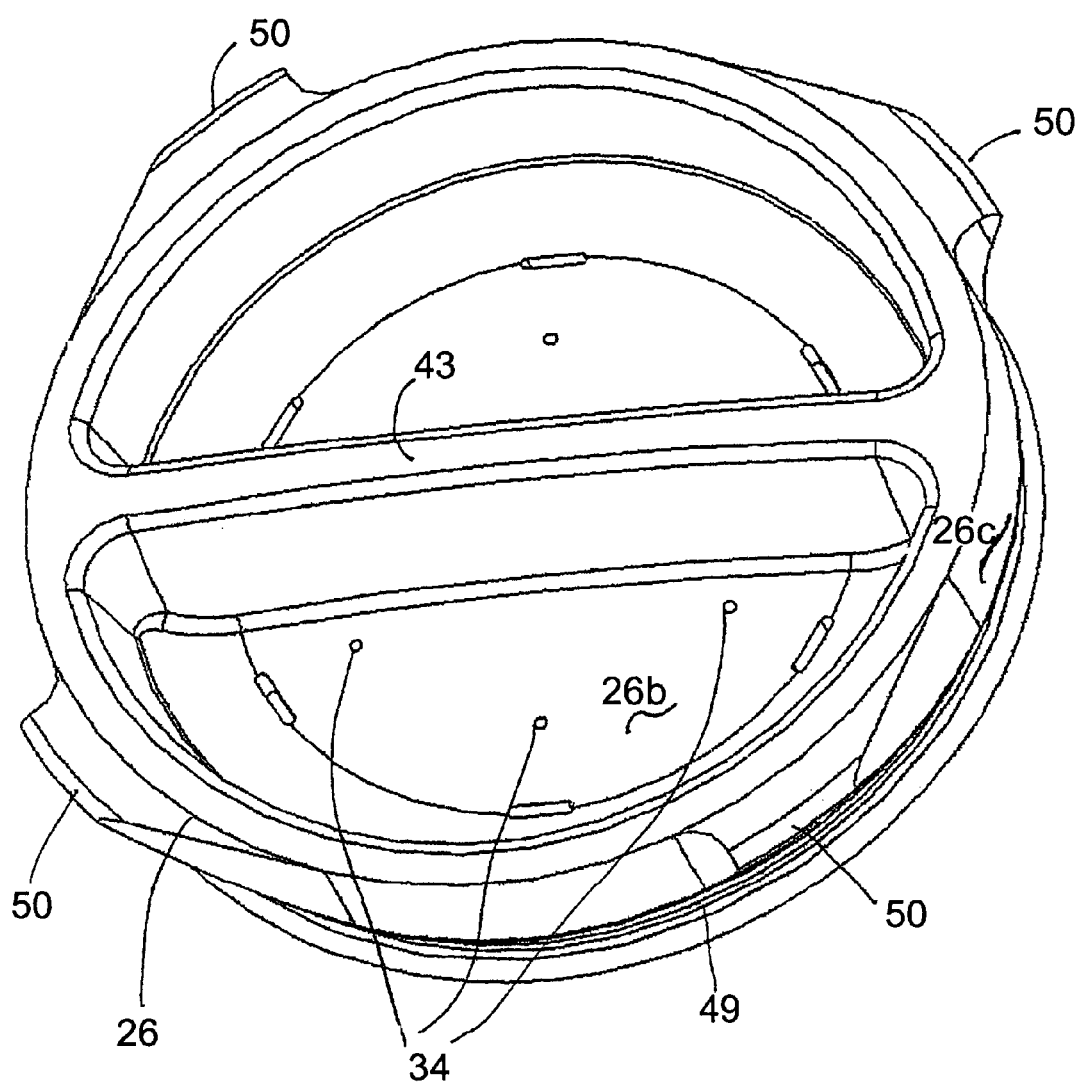
FIG. 8 is an elevated perspective view of a component of a presently preferred embodiment of another aspect of a spray valve as shown in FIGS. 6 and 7.
Figure 9:
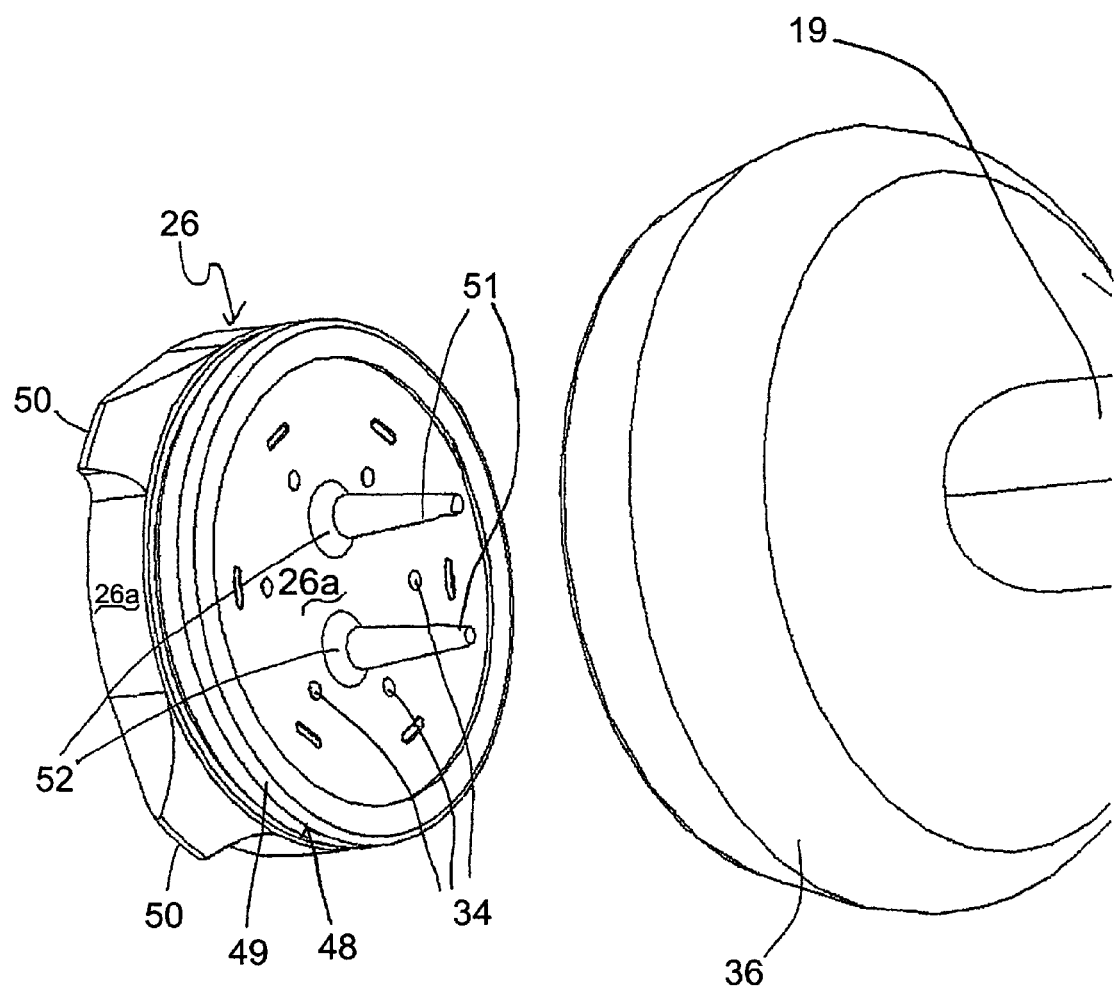
FIG. 9 is an elevated perspective view of the assembly of components of a presently preferred embodiment of a spray valve as shown in FIGS. 6, 7 and 8.
Figure 10:
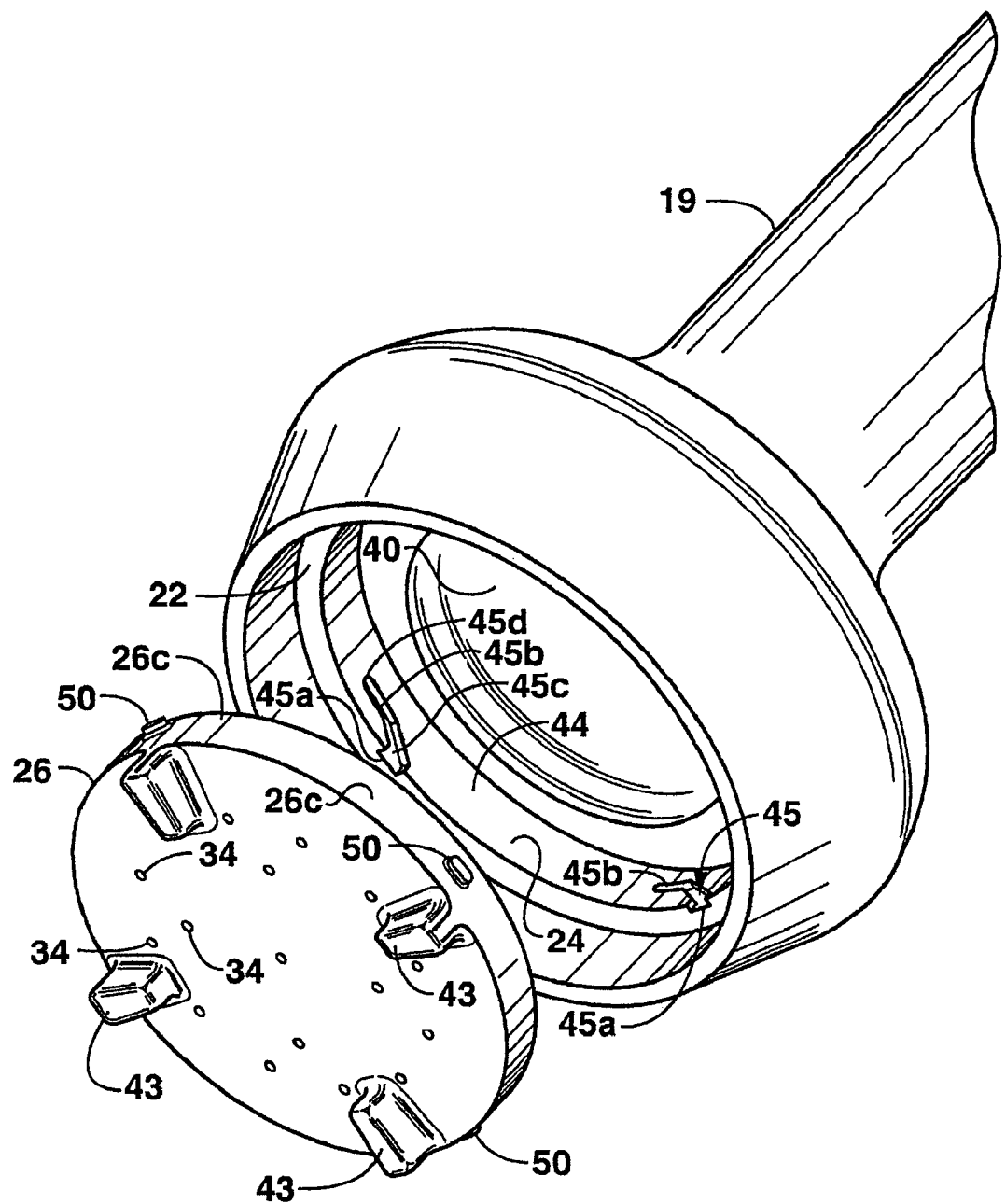
FIG. 10 is an elevated perspective view of the assembly of components of an alternative embodiment of another aspect of a spray valve in accordance with the present invention.
Figure 11:
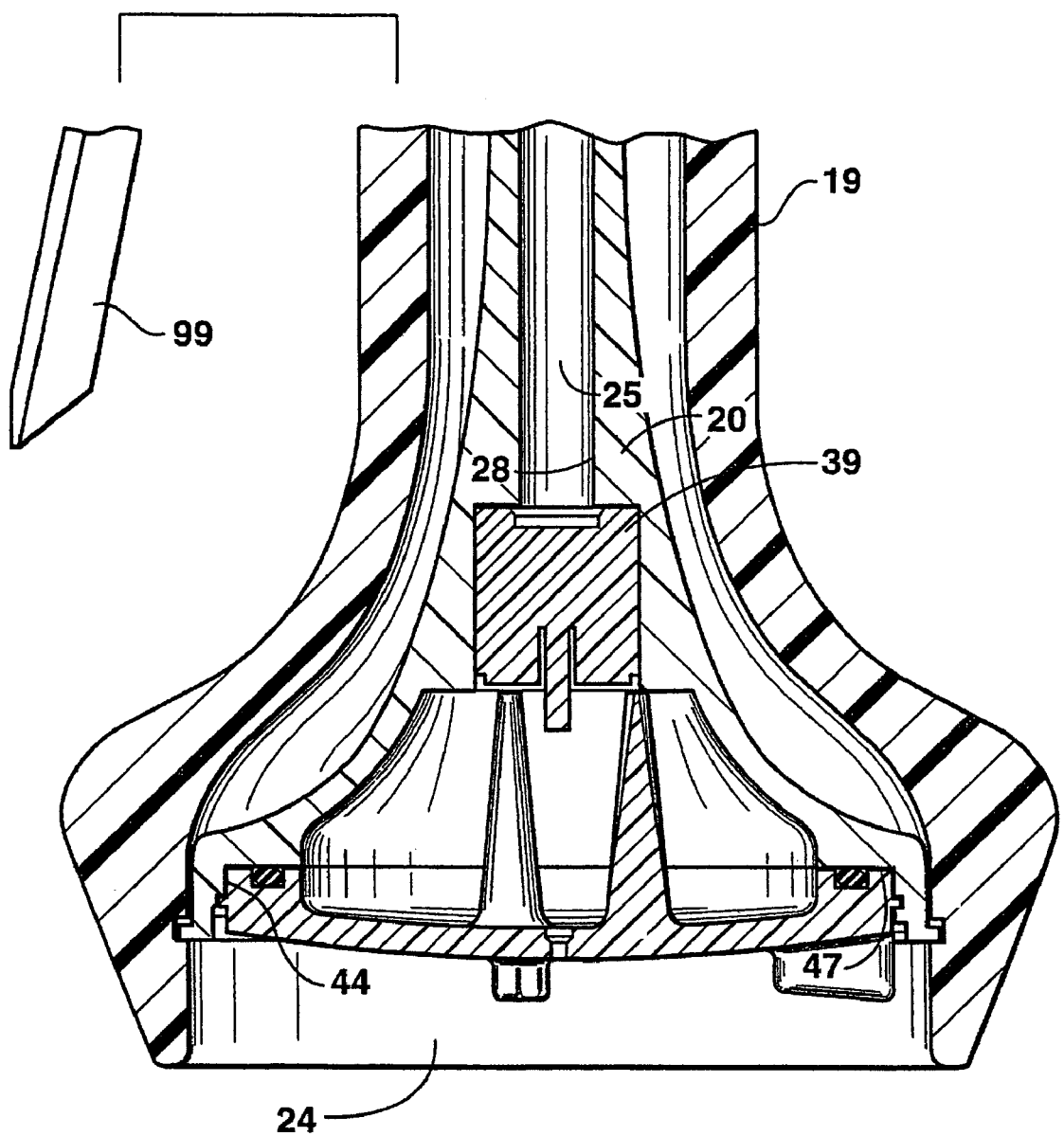
FIG. 11 is partially a cross-sectional view and partially a side plan view of an alternative embodiment of features of a spray valve as shown in FIG. 10.
Figure 12:
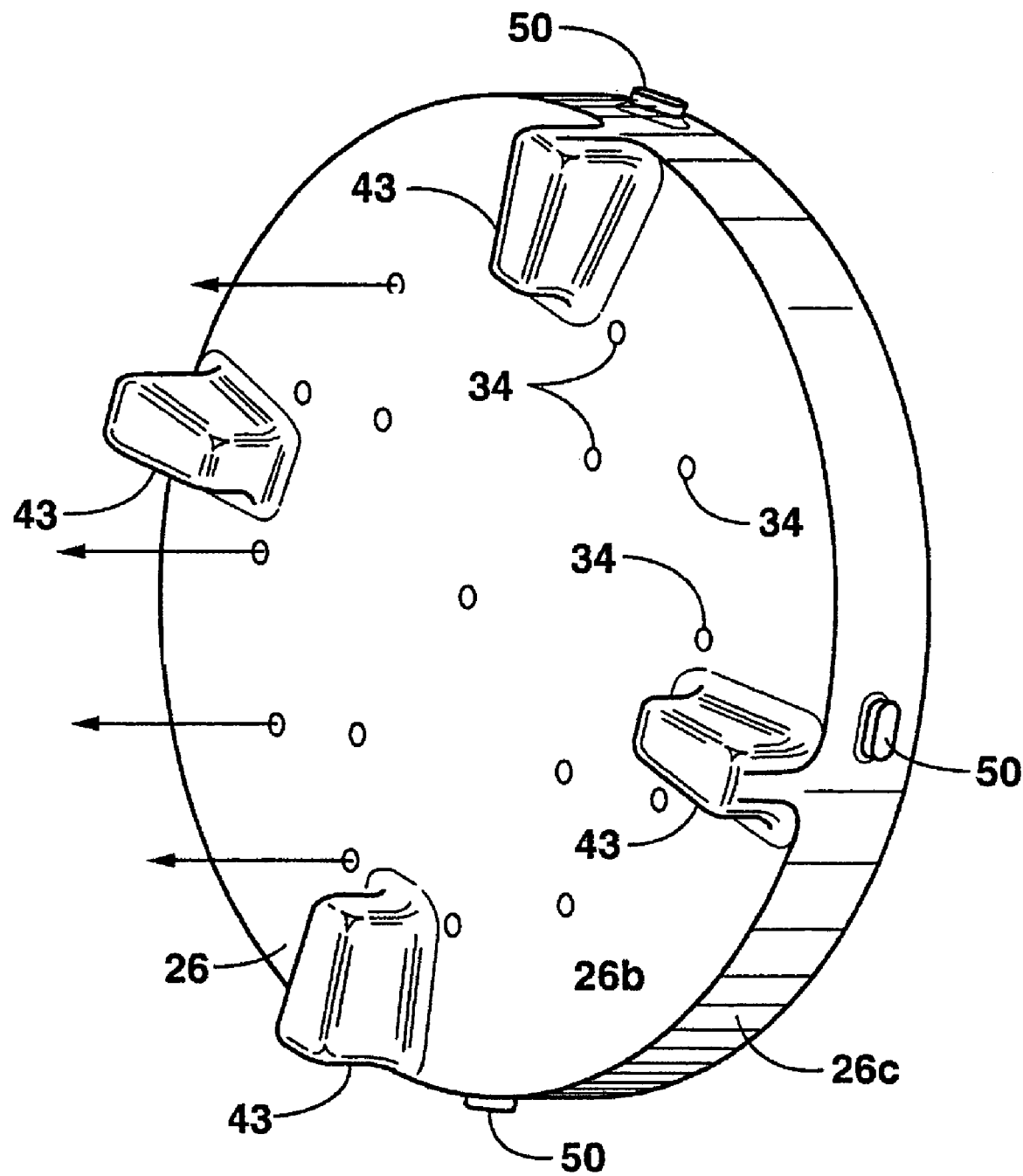
FIG. 12 is an elevated perspective view of a component of an alternative embodiment of another aspect of a spray valve as shown in FIGS. 10 and 11.
Figure 13:
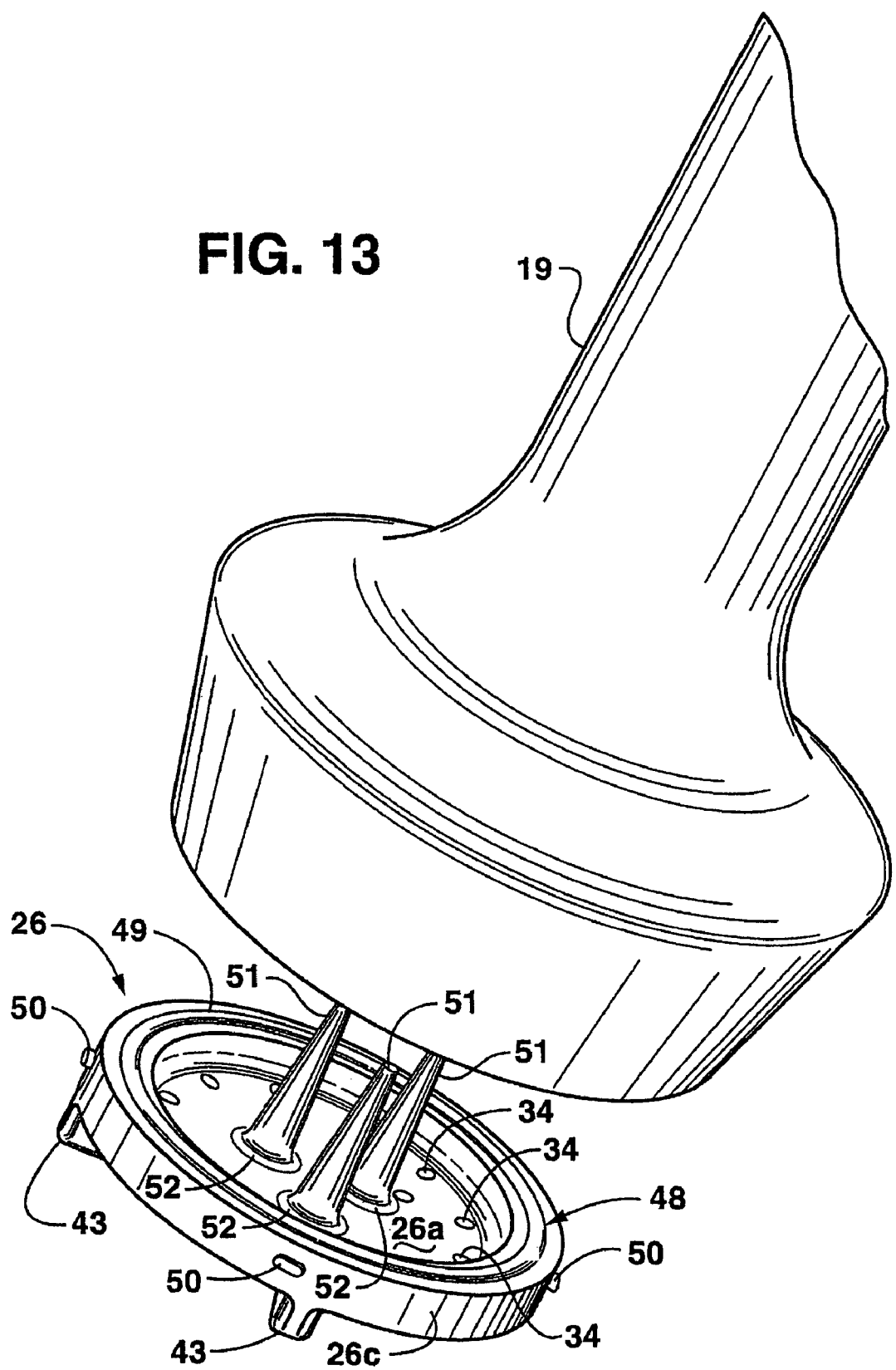
FIG. 13 is an elevated perspective view of the assembly of components of an alternative embodiment of a spray valve as shown in FIGS. 10, 11 and 12.

In further accordance with the present invention, a selectively removable spray disk 26 is provided. A presently preferred embodiment of a selectively removable spray disk 26 is shown in FIGS. 8 and 9 for example. The spray disk 26 defines an inner face 26a (FIG. 9) and an outer face 26b (FIG. 8) that is disposed opposite the inner face 26a. The spray disk 26 defines a plurality of flow nozzle passages 34 that extend axially through the spray disk 26 from the inner face 26a to the outer face 26b of the spray disk 26. As shown in FIG. 9 for example, each of an inner grouping of flow nozzle passages 34 defines a transverse cross-sectional shape that is circular. Similarly, each of an outer grouping of flow nozzle passages 34 defines a transverse cross-sectional shape that is oblong. As shown in FIG. 8 for example, a finger tab 43 extends axially from the outer face 26b.

As shown in FIGS. 8 and 9, the spray disk defines an annular sidewall 26c that extends between the inner face 26a (FIG. 9) and the outer face 26b (FIG. 8). The sidewall 26c of the spray disk 26 defines at least a pair of locking tabs 50. Each locking tab 50 extends radially from the sidewall 26c. Desirably, at least four evenly spaced apart locking tabs 50 are provided in the annular wall 26c that defines the spray disk 26, even though only two tabs 50 are visible in the view that is shown in FIG. 6. Each locking tab 50 is desirably configured to be slideably received and locked within a corresponding locking groove 45 that is described below.

As shown in FIGS. 4, 6 and 7, the outlet opening 24 of the base member 20 is defined by an annular wall 44. As shown in FIG. 6, the annular wall 44 defines at least a pair of locking grooves 45, each locking groove 45 being spaced apart from the other and forming a radially recessed volume beneath the interior surface of the wall 44. Each of the locking grooves 45 is desirably configured to receive therein a mating locking tab 50. As shown in FIG. 6, each locking groove 45 has an entrance 45a that can be entered by a locking tab 50 by movement of the locking tab 50 in an axial direction. The entrance 45a of the locking groove 45 is configured so that the locking tab 50 can be inserted axially through the entrance 45a of the locking groove 45. As shown in FIG. 6, each locking groove 45 further defines a circumferential portion 45b that extends circumferentially part way around the annular wall 44. Each locking groove 45 further defines a transition portion 45c that extends partly circumferentially and partly axially and connects the entrance 45a of each locking groove 45 with the circumferential portion 45b of each locking groove 45. The circumferential portion 45b and transition portion 45c of the locking groove 45 are configured so that the locking tab 50 can be slid partly circumferentially and partly axially along the transition portion 45c of the locking groove 45 and then circumferentially in the circumferential portion 45b of the locking groove 45. As shown in FIG. 6, the end of the circumferential portion 45b of the locking groove 45 terminates in a stop 45d that is located opposite the end of the circumferential portion 45b that connects between the entrance 45a of the locking groove 45 and the transition portion 45c of the locking groove 45. Desirably, at least four evenly spaced apart locking grooves 45 are provided in the annular wall 44 that defines the outlet opening 24 of the base member 20, even though only two grooves 45 are visible in the view that is shown in FIG. 6.

Referring to FIG. 6 for example, when the spray disk 26 is inserted into the outlet opening 24 of the valve 17 and each of the respective locking tabs 50 is disposed into a corresponding mating locking groove 45, then the locking tabs 50 and locking grooves 45 are desirably configured so that less one quarter rotation of the spray disk 26 in a first direction will selectively lock the spray disk 26 to the outlet opening 24 of the valve 17. Similarly, less than one quarter rotation of the spray disk 26 in the opposite direction desirably will unlock the spray disk 26 from the outlet opening 24 of the valve body 17. In this way, the spray pattern of the spray valve 17 easily can be changed by manually twisting the spray disk 26, removing the current spray disk 26 and then inserting the desired spray disk 26 with the desired flow pattern to be achieved by the spray valve 17. The newly inserted spray disk 26 is then locked into place by less than a quarter turn of the spray disk. The extent of the rotation is determined by the shortest circumferential length that defines one of the locking grooves 45, and this circumferential length can be varied to determine a rotation that is more than, as well as less than, one quarter turn.

Removal of and/or insertion of the spray disk 26 is facilitated by the use of the finger tab 43. No external tools or other parts are involved in this procedure of changing the spray pattern of the spray valve 17 of the present invention. In the embodiment shown in FIG. 6, a counter-clockwise rotation of the spray disk 26 relative to the base member 20 will lock the spray disk 26 to the spray valve 17.

As shown in FIG. 9, the annular sidewall 26c of the spray disk 26 defines an annular groove 48 disposed generally near the peripheral edge of the spray disk 26. Nested within this annular groove 48 is a sealing gasket such as an O-ring 49 formed of a deformable elastic material such as rubber for example. The sealing gasket 49 seals against the annular wall 44 that defines the outlet opening 24 of the second end 22 of the base member 20 when the spray disk 26 is locked to the valve 17. This is the presently preferred arrangement, because each changing of the spray disk 26 provides a fresh sealing gasket 49.

As shown in FIGS. 6, 7 and 4 for example, the base member 20 defines an annular shelf 47 that extends radially from the annular wall 44 that defines the outlet opening 24 of the second end 22 of the base member 20. The annular shelf 47 is connected to the annular wall 44 and extends radially from the annular wall 44 toward the centerline of the passage 25.

In an alternative embodiment shown in FIGS. 10, 11,12 and 13, the annular groove 48 can be formed in the annular shelf 47, and the sealing gasket 49 can be disposed in an annular groove that is formed in the annular shelf 47. In this alternative embodiment, the sealing gasket 49 would seal against the inner face 26a of the spray disk 26 when the spray disk is locked to the base member 20. In either embodiment, there will result a seal that is fluid tight under anticipated pressures of the fluid that is expelled from the flow nozzle passages 34 of the spray disk 26.

As shown in FIG. 9, each one of a plurality of truncated conically shaped posts 51 extends axially from the inner face 26a of the spray disk 26. Desirably, these posts 51 are spaced apart from each other, are grouped near the center of the spray disk and are arranged symmetrically with respect to one another. Each post 51 tapers gradually from the base that is connected to the inner face 26a of the spray disk 26 to the free end of the post that is disposed farthest from the inner face of the spray disk. At the base of each post 51, there desirably is a chamfered portion 52 that transitions from the conical surface at the base to the planar surface of the inner face 26a of the spray disk 26. In the embodiment shown in FIG. 9, there are two such posts 51. In the embodiment shown in FIG. 13, there are three such posts 51. When the spray disk 26 is installed in the spray valve 17, the posts 51 project into the expansion chamber 40. It is believed that these posts 51 aid in the even distribution of the water through the flow nozzle passages 34 that are defined through the spray disk 26. It is believed advantageous to have the length of each post 51 (the length being measured from the surface of the inner face 26a of the spray disk 26) desirably about equal to or greater than the radius of the spray disk 26 but less than the diameter of the spray disk 26.

As shown in FIG. 3, the valve body 18 defines a first end 55 and a second end 56, which is disposed opposite the first end 55 of the valve body. As shown in FIG. 3, the valve body 18 defines an inlet opening 57 at the first end 55. As shown in FIG. 3, the second end 56 of the valve body 18 is connected to the first end 21 of the base member 20. Desirably, the second end 56 of the valve body 18 defines an annular neck portion, which is provided with threads on an inner-facing surface thereof. The threads of the second end 56 of the valve body 18 desirably engage complementary threads that are formed on the exterior surface of the first end 21 of the base member 20 to permit a threaded connection.

Figure 14:
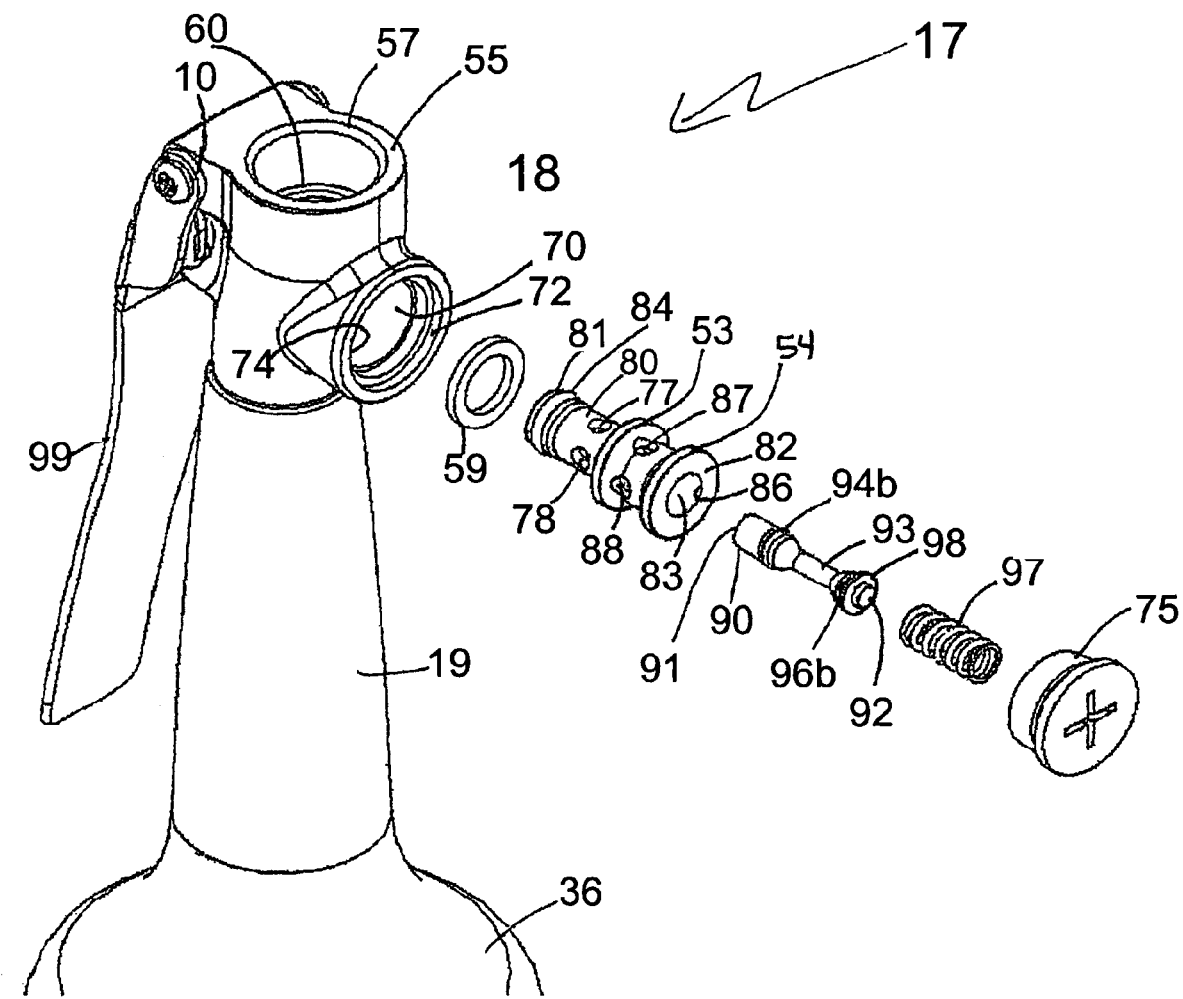
FIG. 14 is an elevated perspective view of the assembly of components of a presently preferred embodiment of one aspect of a spray valve in accordance with the present invention.
Figure 15:
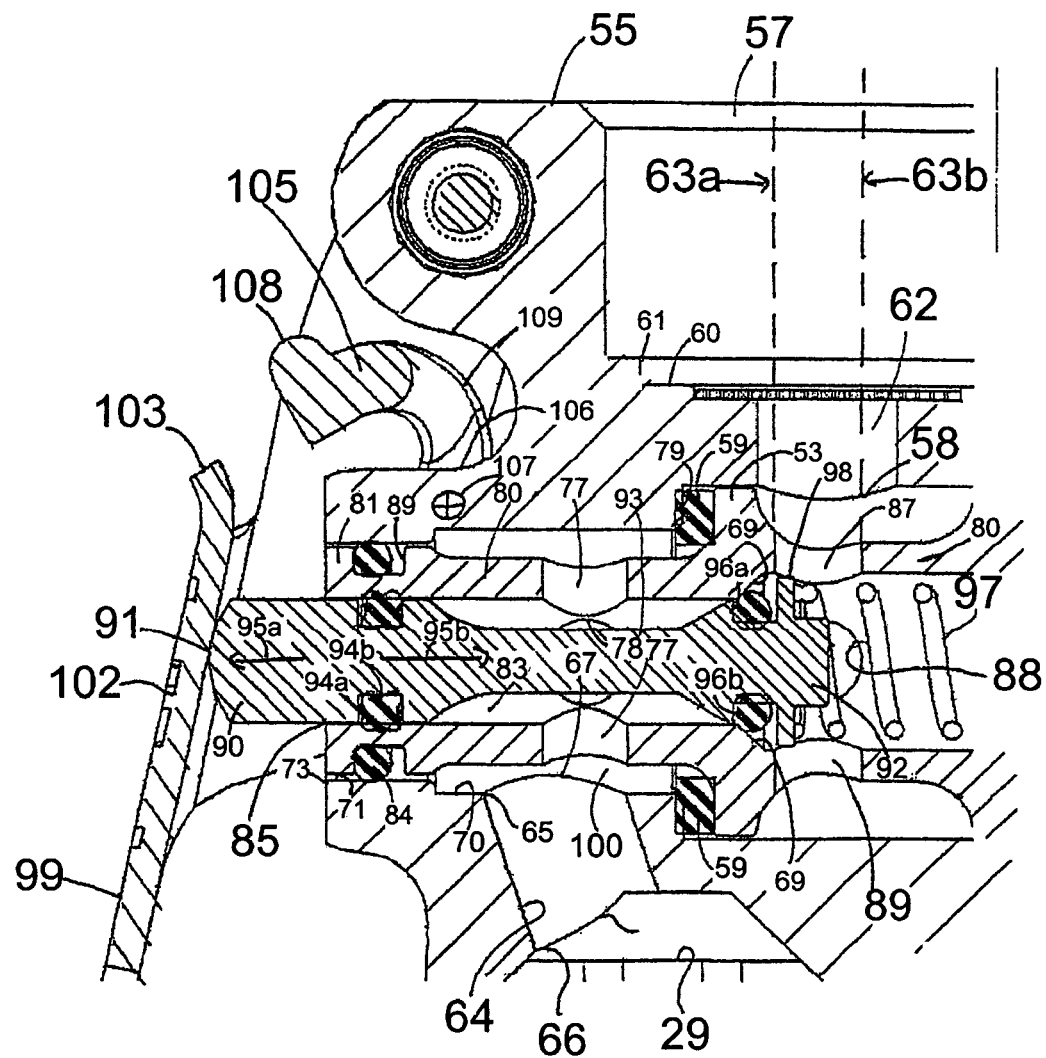
FIG. 15 is a cross-sectional view of a portion of a presently preferred embodiment of several aspects of a spray valve in accordance with the present invention.

As shown in FIGS. 5, 3, 14 and 15, the valve body defines a hollow inlet path 60 internally of the valve body 18. As shown in FIG. 3, a first end 61 of the inlet path 60 defines an entrance opening that is connected in fluid communication with the inlet opening 57 of the valve body 18. The second end 62 of the inlet path 60 is disposed opposite the first end 61 of the inlet path 60. As shown in FIGS. 5, 3 and 15, the entrance opening at the first end 61 of the inlet path 60 aligns with and desirably coincides with the inlet opening 57 of the valve body 18. As shown in FIG. 15, an exit opening 58 is defined at the second end 62 of the inlet path 60. As shown in FIG. 3, the diameter of the inlet path 60 decreases as one proceeds from the entrance opening at the first end 61 of the inlet path 60 of the valve body 18 to the exit opening 58 of the inlet path 60.

As shown in FIG. 15 for example, the valve body 18 defines a hollow conduit 64 that extends generally axially and internally of the valve body 18. The conduit 64 has a first end 65 and a second end 66 that is disposed opposite the first end 65 of the conduit. The first end 65 of the conduit 64 defines an entrance port 67. The second end of the conduit 64 defines an exit port 68 of the valve body 18. As shown in FIG. 3, the exit port 68 of the conduit 64 of the valve body 18 is in fluid communication with the entrance opening 29 of the passage 25 of the base member 20.

As shown in FIGS. 5 and 14 for example, the valve body 18 defines a hollow channel 70 internally of the valve body. The hollow channel 70 is disposed generally transversely relative to the inlet path 60 and relative to the axial direction in which the passage 25 elongates. As shown in FIG. 15, the channel 70 defines a first end 71. As shown in FIG. 3, the channel 70 defines a second end 72 that is disposed opposite to the first end 71. The channel 70 defines a first opening 73 at the first end 71. As shown in FIG. 14, the channel 70 defines a second opening 74 at the second end 72 of the channel.

As shown in FIGS. 5 and 14, a cap 75 is configured and disposed to seal the second opening 74 of the channel 70. As shown in the partial assembly view in perspective in FIG. 14, the cap 75 is selectively removable to selectively seal the second opening 74 of the channel 70.

As shown in FIGS. 5 and 3, the channel 70 is configured to receive therein a generally cylindrically shaped valve insert 80 having a first end 81 and a second end 82 disposed opposite the first end 81 of the valve insert. The exterior surface of the valve insert 80 need not be cylindrical. However, since cylindrical holes are easiest to form in the valve body 18, a cylindrical exterior surface for the valve insert 80 becomes desirable. The valve insert 80 has a cylindrical hollow interior space 83 that is open at each opposite end. As shown in FIG. 15, the valve insert 80 is configured to be disposed within the channel 70 so that the first open end 85 of the valve insert 80 is concentrically disposed relative to the first opening 73 of the channel 70. Similarly, as shown in FIG. 3, the second open end 86 of the valve insert 80 is disposed concentrically with respect to the second opening 74 of the channel 70. The cap 75 butts against the free surface of the second end 82 of the valve insert 80 when the cap 75 is disposed to seal the second opening 72 of the channel 70. As shown in FIG. 3, the cap 75 is configured with a recess 76 that desirably aligns with the second open end 86 of the valve insert 80 and desirably is concentric therewith and cylindrically shaped.

As shown in FIGS. 3 and 14, the cylindrical wall that defines the valve insert 80 is interrupted by a plurality of holes that permit fluid communication from the exterior of the valve insert to the hollow interior 83 of the valve insert 80. As in the embodiment shown, there desirably are two pairs of aligned forward fluid communication holes 77, 78 and two pairs of aligned rearward fluid communication holes 87, 88. As shown in FIG. 14, each pair of aligned fluid communication holes (forward or rearward) desirably is disposed transversely with respect to the other pair of aligned fluid communication holes. Thus, as shown in FIG. 14, there is a first pair of forward axial fluid communication holes 77 disposed with a flow axis at a right angle to the flow axis of a second pair of aligned forward transverse fluid communication holes 78. Similarly, there is a first pair of rearward axial fluid communication holes 87 disposed with a flow axis at a right angle to the flow axis of a second pair of aligned rearward transverse fluid communication holes 88. In the view shown in FIGS. 5 and 3, only two of the axial fluid communication holes (forward 77 and rearward 87) are partially visible. Only one of the forward transverse fluid communication holes 78 is partially visible in FIGS. 5 and 3. Only one of the rearward transverse fluid communication holes 88 is partially visible in FIG. 3.

As shown in FIG. 15, the valve insert 80 has an annular recess 89 formed near the first end 81 thereof. An O-ring 84 is received within this annular recess 89 to provide a water-tight seal between the exterior of the valve insert 80 and the wall that defines the channel 70. As shown in FIGS. 3 and 14 for example, the exterior surface of the valve insert 80 defines a pair of spaced apart annular flanges 53, 54. A rearward one of the annular flanges 54 is disposed at the second end 82 of the valve insert 80. An intermediate annular flange 53 is disposed approximately intermediate the second end 82 and the first end 81 of the valve insert 80. As shown in FIG. 15, a sealing gasket 59 is provided and disposed between the intermediate flange 53 of the valve insert 80 and a ledge 79 that is formed in the channel 70. As shown in FIG. 3, this ledge 79 desirably is formed about midway along the length of the channel 70. The valve insert 80 is thus held in place relative to the channel 70 by virtue of the cap 75 butting against the second end 82 of the valve insert 80 and the intermediate flange 53 butting against the sealing gasket 59, which in turn is butting against the ledge 79 of the channel 70.

As is schematically shown in FIGS. 5, 3 and 15, a pair of parallel dashed vertical lines designated 63a and 63b defines the projected boundary of the rearward pairs of fluid communication holes 87, 88 that are defined through the cylindrical walls of the valve insert 80. As is schematically represented by these lines 63a, 63b in FIGS. 15 and 3, the two rearward pairs of fluid communication holes 87, 88 are generally aligned and disposed within the cylindrical space that is projected from the exit opening 58 of the inlet path 60. Similarly, as shown in FIGS. 3 and 15, the positioning of the valve insert 80 inside the channel 70 desirably aligns the valve insert's forward pairs of fluid communication holes 77, 78 with the entrance port 67 of the conduit 64.

As shown in FIG. 15 for example, the valve insert defines a valve seal surface 69 that is disposed internally of the valve insert 80. Desirably, the valve seal surface 69 is disposed near the intermediate flange 53 of the valve insert 80. The valve seal surface 69 is disposed desirably adjacent the rearward pairs of aligned fluid communication holes 87, 88 that are defined through the valve insert 80. More particularly, the valve seal surface 69 is disposed desirably between adjacent the rearward pairs of aligned fluid communication holes 87, 88 and the adjacent forward pairs of aligned fluid communication holes 77, 78 that are defined through the valve insert 80.

As shown in FIG. 15, the channel 70 is connected to the first end 65 of the conduit 64 at a location along the channel that is between where the valve seal surface 69 of the valve insert 80 is disposed and where the first opening 73 of the channel 70 is disposed. As shown in FIG. 3, the channel 70 also is connected to the exit opening 58 at the second end 62 of the inlet path 60 at a location along the channel that is between where the valve seal surface 69 of the valve insert 80 is disposed and where the second opening 74 of the channel 70 is disposed.

As shown in FIGS. 5, 3, 14 and 15, an elongated, generally cylindrical valve stem 90 has a first end 91 and a second end 92 that is disposed opposite to the first end 92. As shown in FIGS. 14 and 15, the valve stem 90 defines a reduced diameter portion 93 that is disposed between the first end 91 and the second end 92 of the valve stem. As shown in FIG. 15, the valve stem 90 is disposed in the channel 70 and in particular is disposed slideably within the hollow interior 83 of the valve insert 80. As shown in FIG. 15, the first end 91 of the valve stem 90 is disposed closer to the first opening 73 of the channel 70 than to the second opening of the channel. As shown in FIG. 3, the second end 92 of the valve stem 90 is disposed closer to the second opening 74 of the channel 70 than to the first opening 73 of the channel. As shown in FIG. 15, a first circumferential groove 94a is defined between the first end 91 of the valve stem 90 and the reduced diameter portion 93 of the valve stem and receives therein an O-ring 94b. This O-ring 94b slideably engages the interior surface of the wall that defines the interior space 83 of the valve insert 80 so as to prevent water from escaping out of the first open end 85 of the valve insert 90 when the valve stem 90 slides to and fro as schematically indicated by the arrows designated 95a, 95b in FIG. 15.

As shown in FIG. 15, the valve stem 90 defines a second groove 96a between the second end 92 of the valve stem and the reduced diameter portion 93 of the valve stem. As shown in FIGS. 3 and 14, the second groove 96a in the valve stem 90 is disposed near the second end 92 of the valve stem 90. The second groove 96a extends circumferentially around the valve stem 90 and is configured to receive therein a sealing gasket. A sealing gasket 96b is disposed in the second groove 96a of the valve stem 90. The second groove 96a and the sealing gasket 96b are configured to form a water-tight seal against the valve seal surface 69 of the valve insert 80.

As shown in FIGS. 5, 3 and 14, the valve stem 90 defines a seating flange 98 that is disposed between the second groove 96a and the second end 92 of the valve stem 90. As shown in FIGS. 5 and 3, a resilient biasing member is disposed in the channel 70 and located between the second end 92 of the valve stem 90 and the second opening 74 of the channel. A spring 97 provides a suitable resilient biasing member. As shown in FIGS. 5 and 3, one end of the spring 97 is received against the seating flange 98 of the valve stem 90, and the opposite end of the spring 97 is received against a wall 76a that defines the closed end of the recess 76 of the cap 75. In accordance with one aspect of the present invention, the force constant of this spring can be on the order of one to three pounds per inch. The resilient biasing member is configured to bias the valve stem's sealing gasket 96b against the valve seal surface 69 of the valve insert 80 so as to prevent fluid flow between the inlet path 60 and the conduit 64 of the valve body 18.

As shown in FIGS. 15 and 3, the parallel vertically disposed dashed lines 63a, 63b schematically project the path of fluid flow through the inlet path 60 and through the rearward fluid communication holes 87, 88 that are defined in the section of the valve insert 80 that is disposed between the intermediate flange 53 and the second end 82 of the valve insert 80. The flow axis of this inlet path 60 is disposed to extend axially in a manner that is offset from the flow axis of the conduit 64 of the valve body 18. Desirably, the degree of this offset between the respective axes is great enough so that the inlet path 60 and the conduit 64 do not overlap with each other.

As shown in FIGS. 5, 3 and 15, an annular chamber 100 is defined between the interior surfaces of the cylindrical walls that define the valve insert 80 and the reduced diameter portion 93 of the valve stem 90. This annular chamber 100 is configured to be selectively disposed to connect the conduit 64 to the inlet path 60 as the valve stem 90 is selectively positioned within the valve insert 80 relative to the entrance port 67 of the conduit 64 and relative to the exit opening 58 of the inlet path 60.

FIG. 5 shows the valve stem 90 in a position where the valve is open. As shown in FIG. 5, the seating flange 98 of the valve stem 90 is disposed between the inlet path 60 and the second opening 74 of the channel 70 of the valve body 18 when the spray valve 17 is open. As shown in FIG. 5, the sealing gasket 96b is disposed far enough away from sealing contact with the valve seal surface 69 so that at least a portion of the annular chamber 100 overlaps where the exit opening 58 at the second end 62 of the inlet path 60 connects to the channel 70 and the rearward flow communication holes 87, 88 of the valve insert 80. In this open configuration, at least a portion of the annular chamber 100 overlaps where the forward flow communication holes 77, 78 of the valve insert 80 communicate with the conduit 64 of the valve body 18 via the channel 70 and through the entrance port 67 at the first end 65 of the conduit 64. Thus, a continuous and unobstructed flow path exists between the valve's inlet path 60 and conduit 64 so as to permit fluid flow between the inlet path 60 and the conduit 64 of the valve body 18.

Each of FIGS. 15 and 3 shows the valve stem 90 in a position where the valve is closed. The sealing gasket 96b substantially contacts the valve seal surface 69 that is defined in the hollow interior of the valve insert 80. Note in FIGS. 15 and 3, the position of the seating flange 98 of the valve stem 90 relative to the vertically projecting dashed lines 63a, 63b that indicate the flow path of water through the valve insert's rearward fluid communication holes 87, 88 that are aligned with the inlet path 60 defined in the valve body 18. Because of this relative positioning, there will always be dynamic water flow on both opposite surfaces of the seating flange 98 of the valve stem 90 when the valve is almost completely closed and when the valve is just beginning to be opened. Thus, the dynamic pressure applied by the water flow that enters the valve body 18 through the inlet opening 57 essentially will be equalized on both opposite sides of the seating flange 98 of the valve stem 90 when the valve is almost completely closed and when the valve is just beginning to be opened. This equalization of dynamic pressure from the incoming water flow tends to reduce the frequency of vibration that is imposed upon the valve stem 90 and biasing member 97 by the incoming water flow. Accordingly, the valve stem 90 and the biasing spring 97 do not attain the natural frequency of vibration of this mechanical system and therefore avoid the undesirable chattering that characterizes most conventional spray valves.

Moreover, in the spray valve of the present invention with this design of the valve body 18, a lower natural frequency of vibration can be tolerated. Accordingly, the spray valve of the present invention can employ a biasing spring with a lower force constant than a conventional spray valve. By using a spring 97 with a relatively lower force constant, the operator needs less force to open the spray valve of the present invention, thereby causing less fatigue in the hand of the operator and improving the ergonomics of the spray valve's overall operation. In accordance with this aspect of the present invention, the force constant of this spring desirably can be on the order of one to three pounds per inch.

Figure 16:
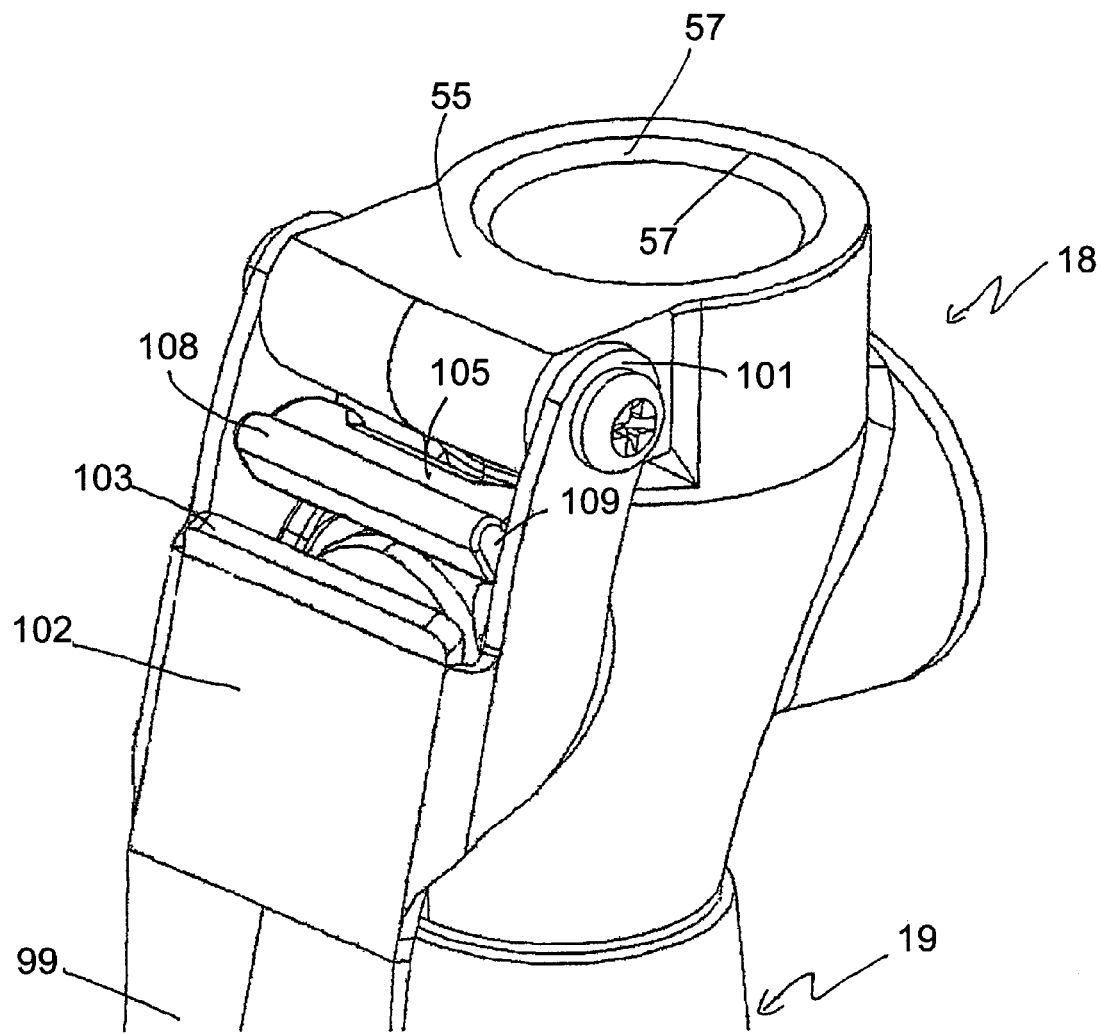
FIG. 16 is an elevated perspective view of part of a presently preferred embodiment of a spray valve as shown in FIG. 15.
Figure 17:
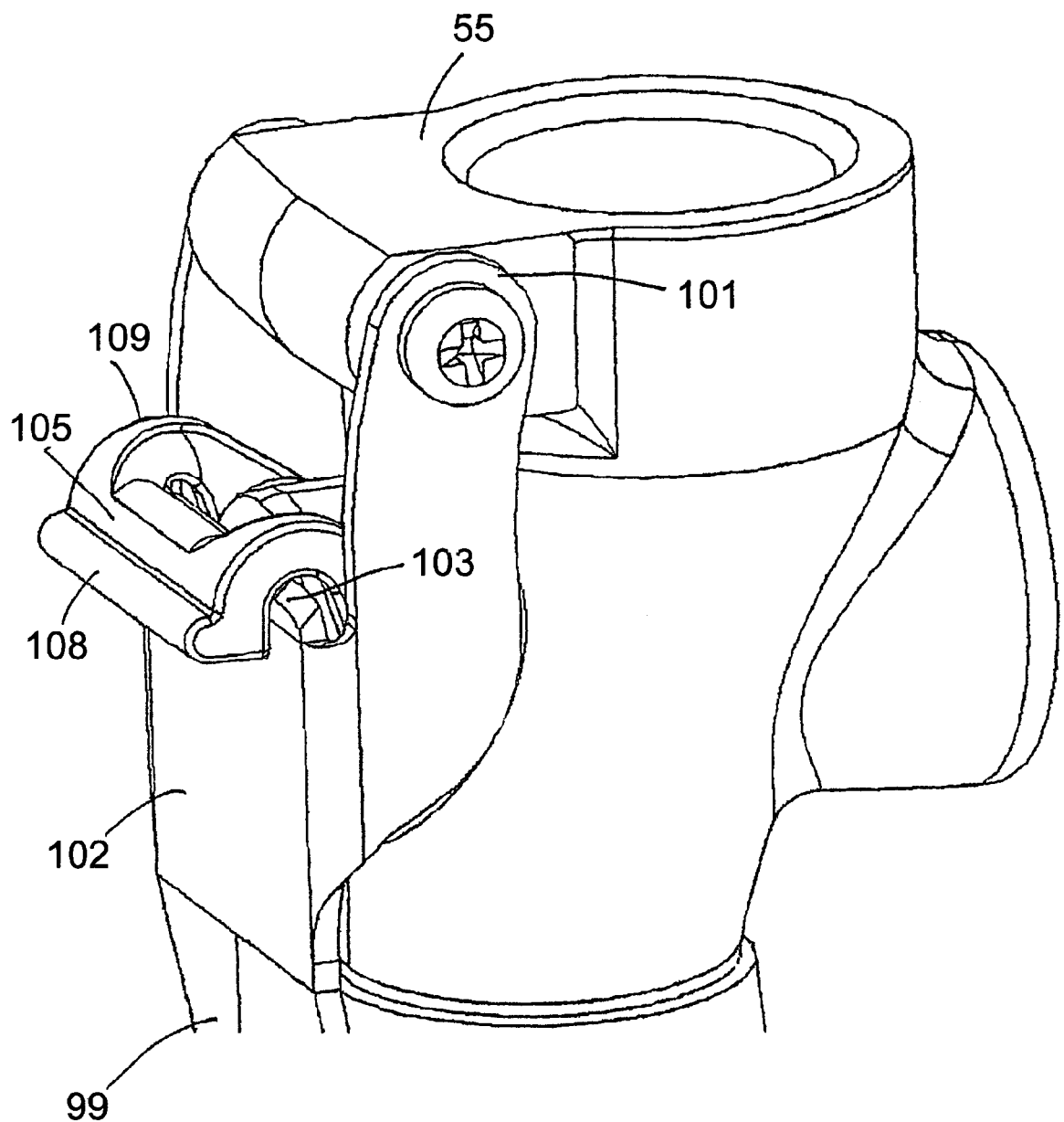
FIG. 17 is an elevated perspective view of part of a presently preferred embodiment of a spray valve shown with the trigger lock engaged.

As shown in FIGS. 2, 5, 3, 15, 16 and 17, the spray valve includes an elongated valve trigger 99 that has a first end 101 that is pivotally connected to the valve body 18 at the first end 55 of the valve body. As shown in FIGS. 15, 16 and 17, the valve trigger 99 has an intermediate portion 102. As shown in FIGS. 5 and 3, the valve trigger 99 extends past the first opening 73 of the channel 70 and the first open end 85 of the valve insert 80. As shown in FIGS. 15, 5 and 3, the intermediate portion 102 of the valve trigger 99 is disposed to be selectively engageable with the first end 91 of the valve stem 90.

As shown in FIG. 3, the valve trigger 99 can be selectively disposed by the operator in a closed position. The position of the valve trigger 99 is such that the valve trigger engages the first end 91 of the vale stem 90, which extends out of the channel 70 through the first opening 73 of the channel 70 and the first open end 85 of the valve insert 80. In this closed-valve position of the valve trigger 99, the resilient biasing member 97 forces the sealing gasket 96b of the valve stem 90 against the valve seal surface 69 of the valve insert 80 so as to prevent fluid flow between the inlet path 60 and the conduit 64 of the valve body 18.

As shown in FIG. 5, the valve trigger 99 can be positioned in the open-valve position wherein the valve trigger 99 engages the first end 91 of the valve stem 90, but the sealing gasket 96b is disposed away from the valve seal surface 69 of the valve insert 80 so as to permit fluid flow between the inlet path 60 and the passage 25 of the valve 17.

Figure 18:
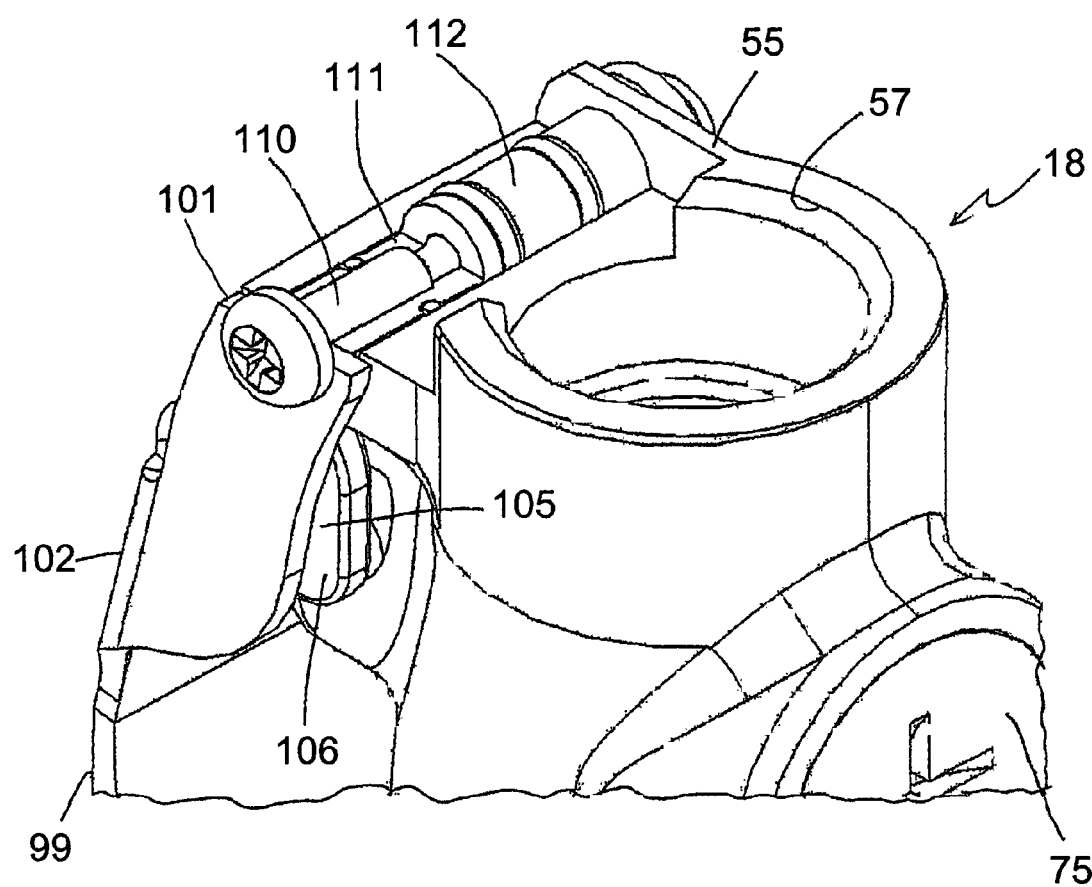
FIG. 18 is an elevated perspective view of part of a presently preferred embodiment of a spray valve shown partially cut away to show the friction device in the pivot for the trigger.

The valve trigger 99 desirably is spring-loaded so that movement of the valve trigger from the position shown in FIG. 3 to the position shown in FIG. 5 requires the user to exert force against the biasing spring that tends to position the valve trigger 99 in the position shown in FIG. 3. As shown in FIG. 18, which illustrates in a perspective view in which part of the first end 55 of valve body 18 has been cut away to reveal certain operating components that otherwise would be hidden from view, the first end 101 of the valve trigger 99 is connected to a journal 110 that is rotatably held in a journal bearing 111. Moreover, one end of the journal 110 is disposed in a journal box 112 that houses a biasing spring (not visible in FIG. 18) that tends to bias the valve trigger 99 into the orientation shown in FIG. 3, and thus works in concert with the resilient biasing member 97 to bias the valve in the closed configuration. Additionally, in further accordance with the present invention, a viscous damping fluid desirably is contained within the journal box 112. In this way, the action of the biasing spring within the journal box 112 is damped so that the valve trigger 99 does not move too suddenly from the position shown in FIG. 5 into the position shown in FIG. 3. Instead, as a consequence of the damping action of the damping fluid working to counteract the biasing force of the biasing spring within the journal box 112 and the action of the resilient biasing member 97, the valve trigger 99 moves only gradually from the position shown in FIG. 5 into the position shown in FIG. 3.

Figure 19:
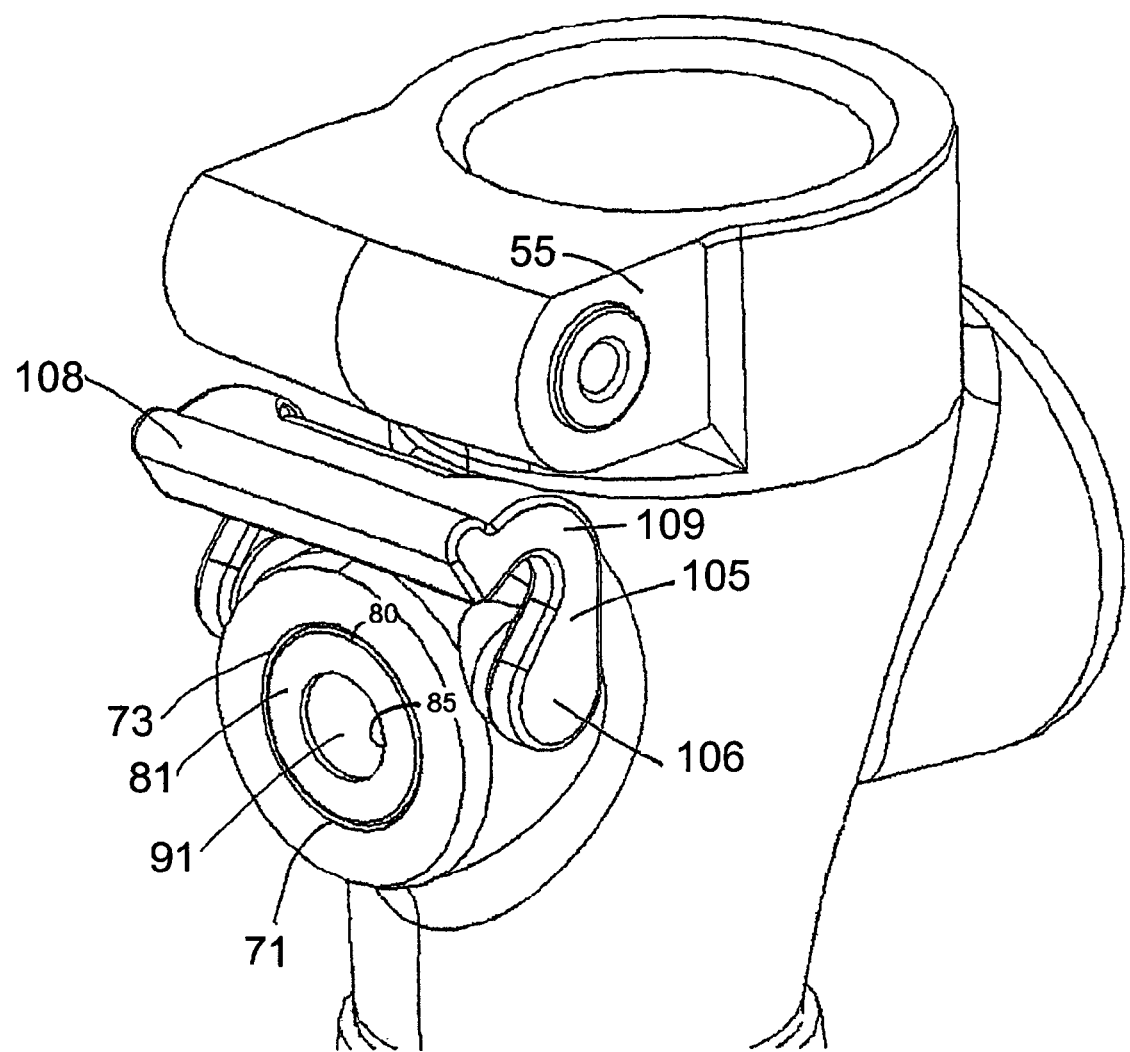
FIG. 19 is an elevated perspective view of part of a presently preferred embodiment of a spray valve shown with the trigger lock disengaged.

As shown in FIG. 16, the valve trigger 99 defines a ridge 103 that is disposed between the intermediate portion 102 of the valve trigger 99 and the first end 101 of the valve trigger 99. As shown in FIGS. 15, 16, 17 and 19, the spray valve can include a trigger lock member 105. As shown in FIG. 19, the trigger lock member 105 defines a first end 106 that is pivotally connected to the valve body at a location that is between the first end 55 of the valve body and the first end 71 of the channel 70. As shown in FIG. 15, the first end 106 of the trigger lock member 105 includes a cylindrical journal 107 at opposite sides thereof (only one being visible in the view shown in FIG. 15) that rests rotatably held in a bearing surface formed in the first end 55 of the valve body. As shown in FIGS. 15, 16, 17 and 19, the trigger lock member 105 defines a finger flange 108 that is configured and disposed opposite the first end 106 of the trigger lock member 105. The trigger lock member 105 further defines a curved portion 109 that is disposed between the finger flange 108 and the first end 106 of the trigger lock member 105. The curved portion 109 is configured to receive the ridge 103 of the valve trigger 99 as shown in FIG. 17.

The trigger lock member 105 is configured to be selectively positionable in a locked position (FIG. 17) and in an unlocked position (FIGS. 5, 3, 15, and 16). When the trigger lock member 105 is positioned in the locked position, as shown in FIG. 17, the valve 17 is open such that the inlet path 60 is connected in fluid communication with the passage 25 of the base member 20 as shown in FIG. 5 so as to permit fluid flow between the inlet path 60 and the passage 25 of the valve 17.

Activation of the trigger lock member 105 permits the operator to relax the grip on the valve trigger 99, which is held in the locked position where the valve 17 remains open for continuous spraying such as is useful in washing down the floor for example. The trigger lock member 105 can be engaged in the locked position or disengaged in the unlocked position by use of the operator's thumb in a flicking motion on the finger flange 108. Since the operator's thumb simply rotates the trigger lock member 105 into place while the valve trigger 99 is being squeezed, operation of the trigger lock member 105 does not require any appreciable force. This one hand operation of the trigger lock 108 provides yet another ergonometrically useful feature of the spray valve 17 in accordance with the present invention.

Moreover, when the operator relaxes the grip on the valve trigger 99 and the trigger lock member 105 is engaged in the locked position, the biasing spring within the journal box 112 of the valve allows the ridge 103 on the valve trigger 99 to capture the trigger lock member 105 in the locked position so that the operator's hand need no longer squeeze the valve trigger 99 to keep the valve open and the water streaming out of the spray face. From this point in the operation, the operator just needs to aim the spraying water that exits from the spray disk 26.

While at least several presently preferred embodiments of the invention have been described using specific terms, each such description is for illustrative purposes only, and it is to be understood that changes and variations may be made without departing from the spirit or scope of the following claims.

What is claimed:

1. A pre-rinse unit spray valve, comprising:
  a valve body defining a first end and a second end disposed opposite the first end, the valve body defining an inlet opening at the first end and an exit at the second end;
  the valve body defining a hollow inlet path internally of the valve body, the inlet path having a first end and a second end disposed opposite the first end of the inlet path, the first end of the inlet path being connected to the inlet opening of the valve body, the second end of the inlet path defining an exit port;
  the valve body defining a hollow conduit extending generally axially and internally of the valve body, the conduit having a first end and a second end disposed opposite the first end of the conduit, the first end of the conduit defining an entrance port, the second end of the conduit defining the exit of the valve body;
  the valve body defining a hollow channel internally of the valve body and disposed generally transversely relative to the inlet path and defining a first end and a second end opposite the first end of the channel, the channel defining a first opening at the first end of the channel and a second opening at the second end of the channel;
  a valve insert having a first end and a second end disposed opposite the first end of the valve insert, the valve insert having an interior wall defining a hollow interior space with a first open end at the first end of the valve insert and a second open end at the second end of the valve insert, the valve insert being disposed within the channel so that the first open end of the valve insert is disposed at the first opening of the channel and the second open end of the valve insert is disposed at the second opening of the channel;

the interior wall of the valve insert defining a valve seal surface that is disposed in the interior space of the valve insert and defines a sealing section of the hollow interior space of the valve insert;

the channel being connected to the exit port of the inlet path at a location along the channel that is between where the valve seal surface of the valve insert is disposed and where the second opening of the channel is disposed;

the channel being connected to the entrance port of the conduit at a location along the channel that is between where the valve seal surface of the valve insert is disposed and where the first opening of the channel is disposed;

a cap configured and disposed to seal the second opening of the channel, the cap butting against the second end of the valve insert when the cap is disposed to seal the second opening of the channel;

an elongated valve stem slidably disposed in the channel, the valve stem having a first end and a second end disposed opposite the first end of the valve stem, the valve stem defining a reduced diameter portion disposed between the first end and the second end of the valve stem, the first end of the valve stem being disposed closer to the first opening of the channel than to the second opening of the channel, the second end of the valve stem being disposed closer to the second opening of the channel than to the first opening of the channel;

the valve stem defining a groove between the second end of the valve stem and the reduced diameter portion of the valve stem, the groove being configured to receive a sealing gasket;

a sealing gasket disposed in the groove of the valve stem;

a resilient biasing member disposed in the channel between the second end of the valve stem and the second opening of the channel and configured to bias the sealing gasket against the valve seal surface of the channel so as to prevent fluid flow between the inlet path and the conduit of the valve body; and an elongated handle having one end pivotally connected to the valve body at the first end of the valve body and extending past the first opening of the channel and disposed to be selectively engageable with the first end of the valve stem, the handle being pivotable between a closed position and an open position, wherein at the closed position of the handle the first end of the valve stem engages the handle and extends out of the channel through the first opening of the channel and the sealing gasket is biased against the valve seal surface of the valve insert so as to prevent fluid flow between the inlet path and the conduit of the valve body, and wherein at the open position of the handle the first end of the valve stem engages the handle and the sealing gasket is disposed away from the valve seal surface of the valve insert so as to permit fluid flow between the inlet path and the conduit of the valve body.

2. A pre-rinse spray valve as in claim 1, wherein the interior wall of the valve insert defines at least one fluid communication hole that permits fluid communication from the exterior of the valve insert to the hollow interior space of the valve insert, the fluid communication hole being generally aligned with the exit port of the inlet path.

3. A pre-rinse spray valve as in claim 2, wherein the interior wall of the valve insert defines at least a second fluid communication hole that permits fluid communication from the exterior of the valve insert to the hollow interior space of the valve insert, the second fluid communication hole being generally aligned with the entrance port of the conduit.

4. A pre-rinse spray valve as in claim 3, wherein the reduced diameter portion of the valve stem and the interior wall of the valve insert define an annular chamber, the annular chamber being configured to be selectively disposed to provide a path for fluid communication between the inlet path via the one fluid communication hole and the conduit via the second fluid communication hole as the valve stem is selectively positioned within the valve insert relative to the exit port of the inlet path and the entrance port of the conduit.

5. A pre-rinse spray valve as in claim 1, wherein the interior wall of the valve insert defines at least a first fluid communication hole that permits fluid communication from the exterior of the valve insert to the hollow interior space of the valve insert, the first fluid communication hole being generally aligned with the entrance port of the conduit.

6. A pre-rinse spray valve as in claim 1, wherein the inlet path is disposed to extend axially offset from the conduit of the valve body.

7. A pre-rinse spray valve as in claim 1, wherein the reduced diameter portion of the valve stem and the interior wall of the valve insert define an annular chamber, the annular chamber being configured to be selectively disposed to connect the conduit to the inlet path as the valve stem is selectively positioned within the valve insert relative to the entrance port of the conduit and to the exit port of the inlet path.

8. A pre-rinse spray valve as in claim 7, wherein at least a portion of the annular chamber overlaps where the exit port of the inlet path connects to the channel when the sealing gasket is disposed away from sealing contact with the valve seal surface of the valve insert.

9. A pre-rinse spray valve as in claim 1, wherein the groove in the valve stem is disposed near the second end of the valve stem, the valve stem defining a seating flange disposed between the groove and the second end of the valve stem.

10. A pre-rinse spray valve as in claim 9, wherein the seating flange of the valve stem is disposed between the exit port of the inlet path and the second opening of the channel of the valve body when the handle is disposed in the open position so as to permit fluid flow between the inlet path and the conduit of the valve body.

11. A pre-rinse spray valve as in claim 1, wherein the cap is selectively removable to selectively seal the second opening of the channel.

12. A pre-rinse unit spray valve, comprising:
a valve body that is configured to regulate the flow of fluid through the pre-rinse spray valve, said valve body defining a first end and a second end disposed opposite the first end and downstream of the first end, the valve body defining an inlet opening at the first end and an exit at the second end;
a base member that is disposed generally downstream from said valve body and that extends generally in an axial direction and defines a first end and a second end, which is disposed axially opposite the first end of the base member and downstream of the first end of the base member, the first end of the base member being connected to the second end of the valve body, the base member defining an outlet opening at the second end of the base member, the base member defining a hollow passage that extends generally axially and internally through a substantial portion of the base member, the base member defining an entrance opening to the passage at the first end of the base member, the exit of the valve body being disposed in fluid communication with the entrance opening of the base member, the base member defining an outlet port of the passage, the outlet port being disposed axially downstream from the entrance opening and upstream from the outlet opening of the base member; and a check valve connected in fluid communication with the passage and disposed between the outlet port of the passage and the outlet opening of the base member, wherein the check valve is configured so as to permit fluid flow through the passage in a downstream direction that points from the outlet port of the passage of the base member to the outlet opening of the base member while substantially preventing fluid flow through the passage in a direction opposite the downstream direction.

13. A pre-rinse unit spray valve, comprising:

a valve body defining a first end and a second end disposed opposite the first end, the valve body defining an inlet opening at the first end and an exit at the second end;

a base member that extends generally in an axial direction and defines a first end and a second end, which is disposed axially opposite the first end of the base member, the first end of the base member being connected to the second end of the valve body, the base member defining an outlet opening at the second end of the base member, the base member defining a hollow passage that extends generally axially and internally through a substantial portion of the base member, the base member defining an entrance opening to the passage at the first end of the base member, the exit of the valve body being in fluid communication with the entrance opening of the passage of the base member, the base member defining an outlet port of the passage, the outlet port being disposed axially downstream from the entrance opening and upstream from the outlet opening of the base member;

the base member defining an expansion chamber having an inlet connected in fluid communication with the outlet port of the passage, the expansion chamber having an outlet connected in fluid communication with the outlet opening of the base member;

the outlet opening of the base member being defined by an annular wall, the annular wall defining at least a pair of spaced apart locking grooves, each locking groove being configured to receive therein a locking tab;

a selectively removable spray disk forming a spray face, the spray disk defining an outer face and an inner face disposed opposite the outer face, the spray disk defining a plurality of flow nozzle passages extending axially through the spray disk from the inner face to the outer face, at least a pair of finger tabs extending axially from the outer face; and the spray disk defining an annular sidewall extending between the outer face and the inner face, the sidewall defining at least a pair of locking tabs extending radially from the sidewall, each locking tab being configured to be slidably received in one of the locking grooves whereupon less than one quarter rotation of the spray disk in a first direction with each locking tab received within a respective one of the locking grooves, selectively locks the spray disk to the annular wall of the base member, and less than one quarter rotation of the spray disk in a direction opposite the first direction with each locking tab received within a respective one of the locking grooves unlocks the spray disk from the annular wall of the base member.

14. A pre-rinse spray valve as in claim 13, wherein:

the base member defines an annular shelf extending radially from the annular wall of the base member;

the inner face of the spray disk defining an annular groove; and a sealing gasket disposed in the annular groove of the spray disk and sealing against the annular shelf of the base member when the spray disk is locked to the base member.

15. A pre-rinse spray valve as in claim 13, wherein:

the base member defines an annular shelf extending radially from the annular wall, the annular shelf defining an annular groove; and a sealing gasket disposed in the annular groove of the annular shelf and sealing against the inner face of the spray disk when the spray disk is locked to the base member.

16. A pre-rinse unit spray valve, comprising:

a valve body defining a first end and a second end disposed opposite the first end, the valve body defining an inlet opening at the first end and an exit at the second end;

a base member that extends generally in an axial direction and defines a first end and a second end, which is disposed axially opposite the first end of the base member, the first end of the base member being connected to the second end of the valve body, the base member defining an outlet opening at the second end of the base member, the base member defining a hollow passage that extends generally axially and internally through a substantial portion of the base member, the base member defining an entrance opening to the passage at the first end of the base member, the exit of the valve body being in fluid communication with the entrance opening of the base member, the base member defining an outlet port of the passage, the outlet port being disposed axially downstream from the entrance opening and upstream from the outlet opening of the base member;

the base member defining an expansion chamber having an inlet connected in fluid communication with the outlet port of the passage, the expansion chamber having an outlet connected in fluid communication with the outlet opening of the base member;

the base member having an exterior surface having a flared portion at the second end of the base member, the diameter of the flared portion increasing in the direction pointing from the entrance opening to the outlet opening of the base member; and an outer sleeve surrounding the base member and connected to the base member at the first end of the base member and at the second end of the base member, the outer sleeve defining an inner surface, the inner surface of the outer sleeve and the exterior surface of the base member defining a gap therebetween.

17. A pre-rinse unit spray valve as in claim 16, wherein: the outer sleeve being formed from heat-insulating flexible material.

18. A pre-rinse unit spray valve as in claim 17, wherein the heat-insulating material includes a thermoplastic elastomer.

19. A pre-rinse unit spray valve as in claim 16, wherein: the portion of the base member defining the passage is formed of flexible material.

20. A pre-rinse unit spray valve as in claim 19, wherein: the flexible material is formed of cross-linked polyethylene.

21. A pre-rinse unit spray valve as in claim 19, wherein: the flared portion of the base member is formed of flexible material.

22. A pre-rinse unit spray valve as in claim 21, wherein: the flexible material is formed of cross-linked polyethylene.

23. A pre-rinse unit spray valve, comprising:

a valve body defining a first end and a second end disposed opposite the first end, the valve body defining an inlet opening at the first end and an exit at the second end;

the valve body defining a hollow inlet path internally of the valve body, the inlet path having a first end and a second end disposed opposite the first end, the first end of the inlet path being connected to the inlet opening of the valve body, the second end of the inlet path defining an exit port;

the valve body defining a hollow conduit extending generally axially and internally of the valve body, the conduit having a first end and a second end disposed opposite the first end of the conduit, the first end of the conduit defining an entrance port, the second end of the conduit defining the exit of the valve body;

the valve body defining a hollow channel internally of the valve body and disposed generally transversely relative to the inlet path and defining a first end and a second end opposite the first end, the channel defining a first opening at the first end of the channel and a second opening at the second end of the channel;

a resilient biasing member disposed in the channel and configured to bias so as to prevent fluid flow between the inlet path and the conduit of the valve body;

an elongated handle having a first end pivotally connected to the valve body at the first end of the valve body, the handle having an intermediate portion extending past the first opening of the channel, the handle being pivotable between a closed position and an open position, wherein at the closed position of the handle the valve is configured so as to prevent fluid flow between the inlet path and the conduit of the valve body, and wherein at the open position of the handle the valve is configured so as to permit fluid flow between the inlet path and the conduit of the valve body, the handle defining a ledge disposed between the intermediate portion and the first end of the handle; and a trigger lock member, the trigger lock member defining a first end pivotally connected to the valve body between the first end of the valve body and the channel the trigger lock member defining a finger flange and a concave portion disposed between the finger flange and the first end of the trigger lock member, the concave portion being configured to receive the ledge of the handle, the trigger lock member being configured to be selectively positionable in a locked position and an unlocked position, wherein when the trigger lock member is positioned in the locked position the inlet path is connected in fluid communication with the conduit of the valve body so as to permit fluid flow between the inlet path and the conduit of the valve body.

24. A pre-rinse unit spray valve, comprising:

a valve body defining a first end and a second end disposed opposite the first end, the valve body defining an inlet opening at the first end and an exit at the second end;

a base member that extends generally in an axial direction and defines a first end and a second end, which is disposed axially opposite the first end of the base member, the first end of the base member being connected to the second end of the valve body, the base member defining an outlet opening at the second end of the base member;

the base member defining a hollow passage that extends generally axially and internally through a substantial portion of the base member, the base member defining an entrance opening to the passage at the first end of the base member, the exit of the valve body being in fluid communication with the entrance opening of the base member, the base member defining an outlet port of the passage, the outlet port of the passage being disposed axially downstream from the entrance opening and upstream from the outlet opening of the base member;

the portion of the base member defining the passage being formed of flexible material;

a check valve connected in fluid communication between the outlet port of the passage and the outlet opening of the base member, wherein the check valve is configured so as to permit fluid flow in a downstream direction that points from the outlet port of the passage of the base member to the outlet opening of the base member while substantially preventing fluid flow in a direction opposite the downstream direction;

the base member defining an expansion chamber having an inlet connected in fluid communication with the outlet port of the passage, the expansion chamber having an outlet connected in fluid communication with the outlet opening of the base member;

the outlet opening of the base member being defined by an annular wall, the annular wall defining at least a pair of spaced apart locking grooves, each locking groove being configured to receive therein a locking tab;

a selectively removable spray disk forming a spray face, the spray disk defining an outer face and an inner face disposed opposite the outer face, the spray disk defining a plurality of flow nozzle passages extending axially through the spray disk from the inner face to the outer face, at least a pair of finger tabs extending axially from the outer face;

the spray disk defining an annular sidewall extending between the outer face and the inner face, the sidewall defining at least a pair of locking tabs extending radially from the sidewall, each locking tab being configured to be slidably received in one of the locking grooves whereupon less than one quarter rotation of the spray disk in a first direction with each locking tab received within a respective one of the locking grooves, selectively locks the spray disk to the annular wall of the base member, and less than one quarter rotation of the spray disk in a direction opposite the first direction with each locking tab received within a respective one of the locking grooves unlocks the spray disk from the annular wall of the base member;

the base member defining an exterior surface having a flared portion at the second end, the diameter of the flared portion increasing in the direction that points from the entrance opening to the outlet opening of the base member;

an outer sleeve surrounding the base member and connected to the base member, the outer sleeve defining an inner surface, the inner surface of the outer sleeve and the exterior surface of the base member defining a gap therebetween;

the valve body defining a hollow inlet path internally of the valve body, the inlet path having a first end and a second end disposed opposite the first end the inlet path, the first end of the inlet path being connected to the inlet opening of the valve body;

the valve body defining a hollow channel internally of the valve body and disposed generally transversely relative to the inlet path and defining a first end and a second end opposite the first end of the channel, the channel defining a first opening at the first end of the channel and a second opening at the second end of the channel;

the valve body defining a hollow conduit extending generally axially and internally of the valve body, the conduit having a first end and a second end disposed opposite the first end of the conduit, the first end of the conduit defining an entrance port, the second end of the conduit defining the exit of the valve body;

a valve insert having a first end and a second end disposed opposite the first end of the valve insert, the valve insert having an interior wall defining a hollow interior space with a first open end at the first end of the valve insert and a second open end at the second end of the valve insert, the valve insert being disposed within the channel so that the first open end of the valve insert is disposed at the first opening of the channel and the second open end of the valve insert is disposed at the second opening of the channel;

the interior wall of the valve insert defining a valve seal surface that is disposed in the interior space of the valve insert and defines a sealing section of the hollow interior space of the valve insert;

the channel being connected to the exit port of the inlet path at a location along the channel that is between where the valve seal surface of the valve insert is disposed and where the second opening of the channel is disposed;

the channel being connected to the entrance port of the conduit at a location along the channel that is between where the valve seal surface of the valve insert is disposed and where the first opening of the channel is disposed;

a selectively removable cap configured and disposed to seal the second opening of the channel;

an elongated, generally cylindrical valve stem slidably disposed in the channel, the valve stem having a first end and a second end disposed opposite the first end of the valve stem, the valve stem defining a reduced diameter portion disposed between the first end and the second end of the valve stem, the first end of the valve stem being disposed closer to the first opening of the channel than to the second opening of the channel, the second end of the valve stem being disposed closer to the second opening of the channel than to the first opening of the channel;

the valve stem defining a groove between the second end of the valve stem and the reduced diameter portion of the valve stem, the groove being configured to receive a sealing gasket;

a sealing gasket disposed in the groove of the valve stem;

a resilient biasing member disposed in the channel between the second end of the valve stem and the second opening of the channel and configured to bias the sealing gasket against the valve seal surface of the valve insert so as to prevent fluid flow between the inlet path and the passage of the valve body;

an elongated handle having a first end pivotally connected to the valve body at the first end of the valve body, the handle having an intermediate portion extending past the first opening of the channel and disposed to be selectively engageable with the first end of the valve stem, the handle being pivotable between a closed position and an open position, wherein at the closed position of the handle the first end of the valve stem engages the handle and extends out of the channel through the first opening of the channel and the sealing gasket is biased against the valve seal surface of the valve insert so as to prevent fluid flow between the inlet path and the conduit of the valve body, and wherein at the open position of the handle the first end of the valve stem engages the handle and the sealing gasket is disposed away from the valve seal surface of the valve insert so as to permit fluid flow between the inlet path of the valve body and the conduit of the valve body, the handle defining a ledge disposed between the intermediate portion and the first end of the handle; and a trigger lock member, the trigger lock member defining a first end pivotally connected to the main valve body between the first end of the valve body and the channel, the trigger lock member defining a finger flange and a concave portion disposed between the finger flange and the first end of the trigger lock member, the concave portion being configured to receive the ledge of the handle, the trigger lock member being configured to be selectively positionable in a locked position and an unlocked position, wherein when the trigger lock member is positioned in the locked position the inlet path is connected in fluid communication with the passage of the base member so as to permit fluid flow between the inlet path of the valve body and the passage of the base member.

* * * * *